US010657959B2

(12) United States Patent
Kirihara

(10) Patent No.: US 10,657,959 B2
(45) Date of Patent: May 19, 2020

(54) INFORMATION PROCESSING DEVICE, INFORMATION PROCESSING METHOD, AND PROGRAM

(71) Applicant: SONY CORPORATION, Tokyo (JP)

(72) Inventor: Reiko Kirihara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 15/305,173

(22) PCT Filed: Apr. 21, 2015

(86) PCT No.: PCT/JP2015/062148
§ 371 (c)(1),
(2) Date: Oct. 19, 2016

(87) PCT Pub. No.: WO2015/186445
PCT Pub. Date: Dec. 10, 2015

(65) Prior Publication Data
US 2017/0047064 A1    Feb. 16, 2017

(30) Foreign Application Priority Data

Jun. 3, 2014    (JP) ................................ 2014-114682

(51) Int. Cl.
*G10L 21/00*    (2013.01)
*G10L 25/00*    (2013.01)
(Continued)

(52) U.S. Cl.
CPC .............. *G10L 15/22* (2013.01); *G06F 3/017* (2013.01); *G06F 3/0304* (2013.01);
(Continued)

(58) Field of Classification Search
CPC ..... G10L 15/26; G10L 15/22; G10L 15/1815; G10L 13/00; G10L 15/265; G10L 13/027;
(Continued)

(56) References Cited

U.S. PATENT DOCUMENTS 7,406,657 B1*    7/2008 Callaghan .............. G06Q 10/10
715/203
9,734,829 B2*    8/2017 Ibuki ....................... G10L 15/22
(Continued)

FOREIGN PATENT DOCUMENTS

JP    2003-108171 A    4/2003
JP    2003-308142 A    10/2003
(Continued)

OTHER PUBLICATIONS

May 28, 2019, Japanese Office Action issued for related JP Application No. 2016-525735.

*Primary Examiner* — Michael Ortiz-Sanchez
(74) *Attorney, Agent, or Firm* — Paratus Law Group, PLLC

(57) ABSTRACT

There is provided an information processing device, an information processing method, and a program that can allow a user to intuitively recognize other information corresponding to a speech output, the information processing device including: a control unit configured to control an output of other information different from a speech output related to a predetermined function on the basis of timing information on timing at which the speech output of an expression related to the function among a set of expressions is made, the set of expressions including the expression related to the function.

24 Claims, 21 Drawing Sheets

(51) Int. Cl.
*G10L 15/22* (2006.01)
*G06F 3/16* (2006.01)
*G06F 3/0482* (2013.01)
*G06F 3/03* (2006.01)
*G06F 3/01* (2006.01)
*H05B 45/00* (2020.01)
*H05B 47/12* (2020.01)
*G06F 3/0484* (2013.01)
*G06F 3/14* (2006.01)
*G10L 15/18* (2013.01)
*G10L 15/00* (2013.01)
*G10L 21/06* (2013.01)
*G06F 3/147* (2006.01)
*G10L 13/027* (2013.01)

(52) U.S. Cl.
CPC ........ *G06F 3/0482* (2013.01); *G06F 3/04842* (2013.01); *G06F 3/1407* (2013.01); *G06F 3/16* (2013.01); *G06F 3/167* (2013.01); *G10L 15/1815* (2013.01); *H05B 45/00* (2020.01); *H05B 47/12* (2020.01); *G06F 3/147* (2013.01); *G10L 13/027* (2013.01); *G10L 15/00* (2013.01); *G10L 21/06* (2013.01)

(58) Field of Classification Search
CPC ......... G10L 15/00; G10L 15/30; G10L 15/08; G10L 2015/221; G10L 17/22; G06F 17/2785; G06F 3/167; G06F 17/2765; G06F 17/28; G06F 17/30654; G06F 17/30684; G06F 17/30976; G06F 3/16; G06F 17/30522; G06F 2203/0381; G06F 3/048; G06F 3/0481; G06F 3/147
See application file for complete search history.

(56) References Cited

U.S. PATENT DOCUMENTS

| | | | | |
|---|---|---|---|---|
| 2002/0147589 A1* | 10/2002 | Itaki | ........................ | G10L 15/26 704/260 |
| 2004/0260438 A1* | 12/2004 | Chernetsky | ............. | G10L 15/22 701/36 |
| 2005/0048992 A1* | 3/2005 | Wu | ........................ | H04M 3/493 455/466 |
| 2006/0004743 A1* | 1/2006 | Murao | ............... | H04N 7/17318 |
| 2007/0185704 A1* | 8/2007 | Yoshimura | .............. | G10L 17/26 704/10 |
| 2007/0239459 A1* | 10/2007 | Horvitz | ..................... | G06F 3/16 704/275 |
| 2008/0147406 A1* | 6/2008 | Da Palma | ............... | G10L 15/22 704/260 |
| 2009/0187407 A1* | 7/2009 | Soble | ..................... | G10L 13/00 704/260 |
| 2012/0016678 A1* | 1/2012 | Gruber | ................ | G06F 17/3087 704/275 |
| 2012/0265535 A1* | 10/2012 | Bryant-Rich | ....... | H04M 1/7255 704/270 |
| 2012/0319951 A1* | 12/2012 | Lee | .......... | G06F 1/169 345/161 |
| 2013/0151249 A1* | 6/2013 | Nakadai | ................... | G08B 5/00 704/231 |
| 2013/0179173 A1* | 7/2013 | Lee | ......................... | G10L 15/22 704/275 |
| 2014/0122619 A1* | 5/2014 | Duan | ...................... | G06F 17/27 709/206 |
| 2014/0244712 A1* | 8/2014 | Walters | ................... | H04L 67/10 709/202 |
| 2014/0379341 A1* | 12/2014 | Seo | .......................... | G10L 15/22 704/246 |
| 2015/0058007 A1* | 2/2015 | Kim | .......................... | G06F 17/24 704/235 |
| 2015/0205568 A1* | 7/2015 | Matsuoka | ................. | G06F 3/16 704/246 |
| 2016/0004322 A1* | 1/2016 | Takada | .............. | G06K 9/00355 345/173 |
| 2016/0035352 A1* | 2/2016 | Furumoto | .......... | G01C 21/3608 704/276 |
| 2016/0313868 A1* | 10/2016 | Weng | ....................... | G06F 3/017 |
| 2017/0201613 A1* | 7/2017 | Engelke | ................... | G10L 15/06 |
| 2017/0329766 A1* | 11/2017 | Matsuyama | ........ | G06F 17/2785 |
| 2018/0190264 A1* | 7/2018 | Mixter | .................. | H04L 12/282 |

FOREIGN PATENT DOCUMENTS

| | | |
|---|---|---|
| JP | 2005-056170 A | 3/2005 |
| JP | 2006-235671 A | 9/2006 |
| WO | WO 2006/075369 A1 | 7/2006 |

* cited by examiner

FIG.5

| INPUT INFORMATION | REQUEST CONTENT | CORRESPONDING FUNCTION | RESPONSE CONTENT |
|---|---|---|---|
| What can you do? | CHECK FUNCTION | — | Clock, weather forecast, family calendar can be shown |
| What time is it in ○○? | CHECK TIME | CLOCK | It is ×× o'clock |
| How is the weather in △△? | CHECK WEATHER FORECAST | WEATHER FORECAST | It is sunny/rainy/cloudy. |
| What is △△'s plan? | CHECK SCHEDULE | FAMILY CALENDAR | △△ will do … at ×× o'clock |
| △△ will … at ×× o'clock | REGISTER SCHEDULE | FAMILY CALENDAR | The plan has been registered |

FIG.13

| ANIMATION | |
|---|---|
| visible/invisible | MAKE DISPLAY INFORMATION VISIBLE/INVISIBLE |
| fade-in/out(300ms) | FADE IN/FADE OUT DISPLAY INFORMATION WITHIN SPECIFIED TIME |
| expand/shrink(300ms) | EXPAND/SHRINK DISPLAY INFORMATION WITHIN SPECIFIED TIME |
| flash(2) | BLINK DISPLAY INFORMATION AS MANY TIMES AS SPECIFIED NUMBER OF TIMES |
| flash(1000ms) | BLINK DISPLAY INFORMATION WITHIN SPECIFIED TIME |
| move to (x,y,z) | MOVE DISPLAY INFORMATION TO SPECIFIED (FIRST-DIMENSIONAL/SECOND-DIMENSIONAL/THIRD-DIMENSIONAL) COORDINATES |
| scroll (2) | SCROLL DISPLAY INFORMATION AS MUCH AS SPECIFIED |
| scroll to (oid) | MOVE DISPLAY INFORMATION TO SPECIFIED OBJECT |

| LED | |
|---|---|
| on/off(RED) | TURN ON/TURN OFF LED IN SPECIFIED COLOR |
| fade-in/out(300ms, RED) | FADE IN/FADE OUT LED WITHIN SPECIFIED TIME/IN SPECIFIED COLOR |
| flash(2) | BLINK LED AS MANY TIMES AS SPECIFIED NUMBER OF TIMES |
| flash(1000ms) | BLINK LED WITHIN SPECIFIED TIME |

| SOUND FEEDBACK | |
|---|---|
| start(sound_id) | REPRODUCE SPECIFIED SOUND |
| start(sound_id, 2) | REPRODUCE SPECIFIED SOUND AS MANY TIMES AS SPECIFIED NUMBER OF TIMES |
| start(sound_id, 1000ms) | REPRODUCE SPECIFIED SOUND ONLY FOR SPECIFIED TIME |
| stop | STOP AUDIO OUTPUT |
| fade-in/out | FADE IN/FADE OUT AUDIO OUTPUT |
| volume (vol) | SET AUDIO OUTPUT AT SPECIFIED VOLUME |
| muting | MUTE AUDIO OUTPUT (CONTINUE REPRODUCING AUDIO OUTPUT, BUT SET ZERO AS VOLUME) |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/062148 (filed on Apr. 21, 2015) under 35 U.S.C. § 371, which claims priority to Japanese Patent Application No. 2014-114682 (filed on Jun. 3, 2014), which are all hereby incorporated by reference in their entirety.

TECHNICAL FIELD

The present disclosure relates to an information processing device, an information processing method, and a program.

BACKGROUND ART

Recent years have seen developing speech synthesis technology that converts text information into speech, speech recognition technology that recognizes the content of what a user says as text information, and natural language processing technology that recognizes the content indicated by sentences. Accordingly, interactive user interfaces (UIs) based on speech inputs have been gaining widespread use which apply the above-mentioned kinds of technology to allow users to operate a variety of home appliances such as television receivers and information devices such as personal computers through speech interaction.

There is an ongoing study on a mechanism that combines showing information by outputting speech with showing information by a different output method (e.g. showing display information such as an image and an animation) other than speech outputs to allow a user of the interactive user interface based on speech inputs to more intuitively recognize the information.

CITATION LIST

Patent Literature

Patent Literature 1: JP 2005-165438A

SUMMARY OF INVENTION

Technical Problem

Meanwhile, as a greater variety of multifunctional home appliances and information devices (which will also be genetically referred to as "information processing devices") are available today, the information processing devices provide all the more information to users. Accordingly, the information processing devices frequently show pieces of information to the users as a set of information.

However, when pieces of information are shown as a set of information, the relationship between each piece of information output as speech (i.e. each expression output as speech) and each piece of information output by another output method (e.g. display information such as an image and an animation) is not necessarily shown clearly, which prevents an intuitive operation in some cases.

The present disclosure then proposes an information processing device, an information processing method, and a program that can allow a user to intuitively recognize other information corresponding to a speech output.

Solution to Problem

According to the present disclosure, there is provided an information processing device including: a control unit configured to control an output of other information different from a speech output related to a predetermined function on the basis of timing information on timing at which the speech output of an expression related to the function among a set of expressions is made, the set of expressions including the expression related to the function.

In addition, according to the present disclosure, there is provided an information processing method including: controlling, by a processor, an output of other information different from a speech output related to a predetermined function on the basis of timing information on timing at which the speech output of an expression related to the function among a set of expressions is made, the set of expressions including the expression related to the function.

In addition, according to the present disclosure, there is provided a program for causing a computer to execute: controlling an output of other information different from a speech output related to a predetermined function on the basis of timing information on timing at which the speech output of an expression related to the function among a set of expressions is made, the set of expressions including the expression related to the function.

Advantageous Effects of Invention

According to the present disclosure as described above, it is possible to allow a user to intuitively recognize other information corresponding to a speech output.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for describing an example of response content according to input information.

FIG. 13 is a diagram illustrating an example of control information that can be defined by response information.

DESCRIPTION OF EMBODIMENT(S)

Figure 1:
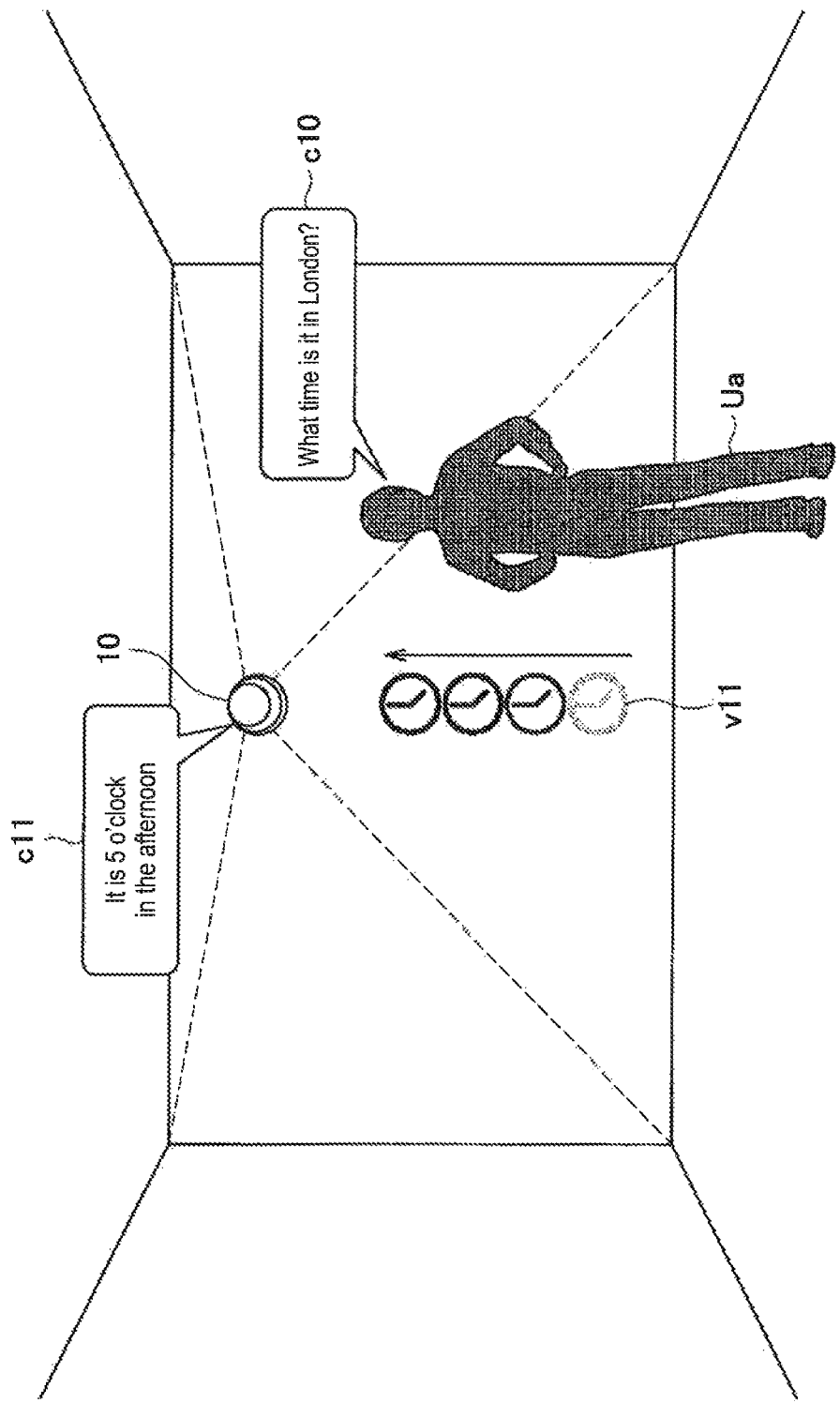
FIG. 1 is an explanatory diagram for describing an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

A description will be now made in the following order.
1. Overview
2. Functional configuration
3. Processing
4. Examples
4.1. Example 1: Example of method of showing display information
4.2. Example 2: Example of method of showing display information
4.3. Example 3: Example in which showing information is controlled in accordance with processing content
4.4. Example 4: Example of method of showing information to plurality of users
4.5. Example 5: Example of method of showing information with interrupt by user
5. Hardware configuration
6. Conclusion <1. Overview>

An information processing device 10 according to the present embodiment includes a so-called interactive user interface that is based on a speech input and allows a user Ua to operate the information processing device 10 through speech interaction with the information processing device 10. The overview of the information processing device according to an embodiment of the present disclosure will be described with reference to FIG. 1. FIG. 1 is an explanatory diagram for describing an overview of an information processing device according to the present embodiment.

As illustrated in FIG. 1, the information processing device 10 includes a sound collection device (not illustrated) such as a microphone, and is configured to be capable of collecting speech information said by the user Ua via the sound collection device as a speech input c10. In addition, the information processing device 10 includes an audio output device such as a speaker, and is configured to be capable of showing speech information c11 to the user Ua via the audio output device. In the example illustrated in FIG. 1, the information processing device 10 is configured to be installable on the wall or the like, and uses the wall as a projection plane to project display information v11 such as an image or an icon on the wall like a so-called projector, thereby displaying the display information v11 on the wall.

Based on such a configuration, the information processing device 10 is configured to be operable by the user Ua saying the content that indicates a request to the information processing device 10. Specifically, the information processing device 10 acquires, as the speech input c10, the content of what the user Ua says, and responds to the request of the user Ua indicated by the content of the speech input c10 by outputting the speech information c11 and the display information v11.

For example, in the example illustrated in FIG. 1, the user Ua says "What time is it in London?" to ask the information processing device 10 to "show what time it is in London" as a request. The information processing device 10 then collects, as the speech input c10, the sounds of what the user Ua has said, and analyzes the speech input c10 on the basis of speech recognition technology, thereby converting the speech input c10 into text information. The information processing device 10 analyzes the text information into which the speech input c10 has been converted, on the basis of natural language processing technology (such as lexical analysis, syntactic analysis, and semantic analysis), thereby recognizing the semantic content indicated by the text information (in other words, the semantic content indicated by the speech input c10).

The information processing device 10 executes the corresponding application (i.e. function) on the basis of the semantic content indicated by the speech input c10. For example, in the example illustrated in FIG. 1, the information processing device 10 executes the application of "clock" for acquiring the time in a specified area.

The information processing device 10 outputs speech information c11 indicating an execution result of the application as a response to the speech input c10 of the user Ua, and shows the display information v11 such as an icon or an image indicating the execution result in coordination with the output of the speech information c11. For example, in the example illustrated in FIG. 1, the information processing device 10 outputs the speech information c11 of "It is 5 o'clock in the afternoon" on the basis of the execution result of the "clock" application as a response to the speech input c10 of "What time is it in London?".

The information processing device 10 then displays the display information v11 (such as an icon) of the clock recognizably showing "5 o'clock in the afternoon" in coordination with the output of the speech information c11 of "It is 5 o'clock in the afternoon" so as to fade in the display information v11 into the projection plane.

In this way, the information processing device 10 according to the present embodiment outputs, as the speech information c11, the response to the request of the user shown as the speech input c10, and displays the display information v11, thereby visually showing the user Ua the response content. This allows the user Ua to more intuitively recognize the response content of the information processing device 10 than when only the speech information c11 is output.

Meanwhile, in the example illustrated in FIG. 1, the information processing device 10 shows only a single piece of information indicating "5 o'clock in the afternoon" to the user Ua. Accordingly, the user Ua can intuitively recognize that the speech information c11 and the display information v11, which are output here, correspond to the information of "5 o'clock in the afternoon".

The information processing device 10 does not, however, necessarily show only a single piece of information to the user Ua, but shows a set of information including different pieces of information as speech information and display information in some cases. For example, FIG. 2 is an explanatory diagram for describing the overview of the information processing device according to the present embodiment, and illustrates an example in which the information processing device 10 shows the user Ua a set of information including pieces of information as speech information and display information.

Figure 2:
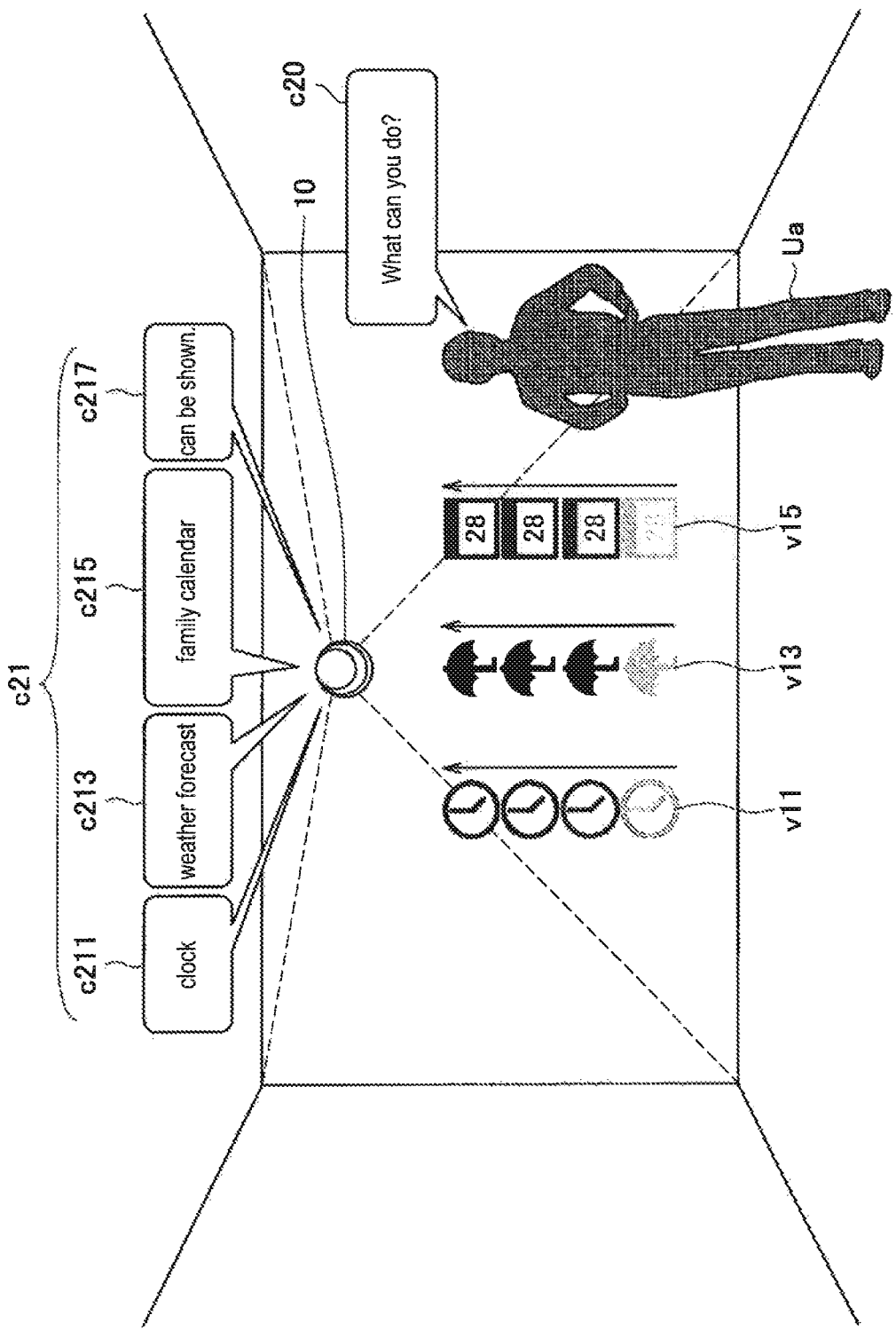
FIG. 2 is an explanatory diagram for describing an example of a schematic operation of the information processing device according to the embodiment.

In the example illustrated in FIG. 2, the user Ua says "What can you do?" to the information processing device 10, thereby requesting the information processing device 10 to "show the list of functions (executable applications) of the information processing device 10". In response to this, the information processing device 10 outputs speech information c21 of "Clock, weather forecast, family calendar can be shown", and displays display information v11, display information v13, and display information v15 respectively indicating "clock", "weather forecast", and "family calendar" in coordination with the output of the speech information c21. Additionally, as illustrated in FIG. 2, the speech information c21 includes an expression c211 indicating the function of "clock", an expression c213 indicating the function of "weather forecast", an expression c215 indicating the function of "family calendar", and an expression c217 indicating the auxiliary phrase of "can be shown".

For example, even if the display information v11, the display information v13, and the display information v15 are output as a set of information simply in coordination with the set of expressions c211 to c217 (i.e. speech information c21), the user Ua would not be necessarily able to recognize the relationship between the expressions c211 to c217 and the display information v11, the display information v13, and the display information v15.

As a specific example, it is assumed that when the information processing device 10 outputs the expressions c211 to c217 as the set of speech information c21, the information processing device 10 concurrently shows the user Ua the display information v11, the display information v13, and the display information v15 in coordination with the output of the speech information c21. The user Ua can then recognize intuitively that the set of speech information c21 and the set of display information v11, display information v13, and display information v15 correspond to each other.

To relate the expressions c211, c213, and c215 to the display information v11, the display information v13, and the display information v15, respectively, the user Ua, however, has to undergo the thinking processes of understanding the meanings indicated by the display information v11, the display information v13, and the display information v15, and relating the display information v11, the display information v13, and the display information v15 to the expressions c211, c213, and c215, respectively, which have been output as speech.

Even if the display information v11, the display information v13, and the display information v15 are output in this way as a set of information simply in coordination with the set of expressions c211, c213, and c217 (i.e. speech information c21), the method of showing information prevents the user Ua from intuitively operating the information processing device 10 in some cases.

The information processing device 10 according to the present embodiment then controls the outputs of the display information v11, the display information v13, and the display information v15 related to the respective functions in synchronization with the speech outputs of the expressions c211, c213, and c215 corresponding to the functions among the set of expressions c211 to c217.

As a specific example, the information processing device 10 displays the display information v11 indicating the function of "clock" so as to fade in the display information v11 into the projection plane in synchronization with the speech output of the expression c211 indicating the function of "clock" among the set of expressions c211 to c217.

The information processing device 10 then displays the display information v13 indicating the function of "weather forecast" so as to fade in the display information v13 into the projection plane in synchronization with the speech output of the expression c213 indicating the function of "weather forecast". The information processing device 10 similarly displays the display information v15 indicating the function of "family calendar" so as to fade in the display information v15 into the projection plane in synchronization with the speech output of the expression c213 indicating the function of "family calendar".

Figure 3:
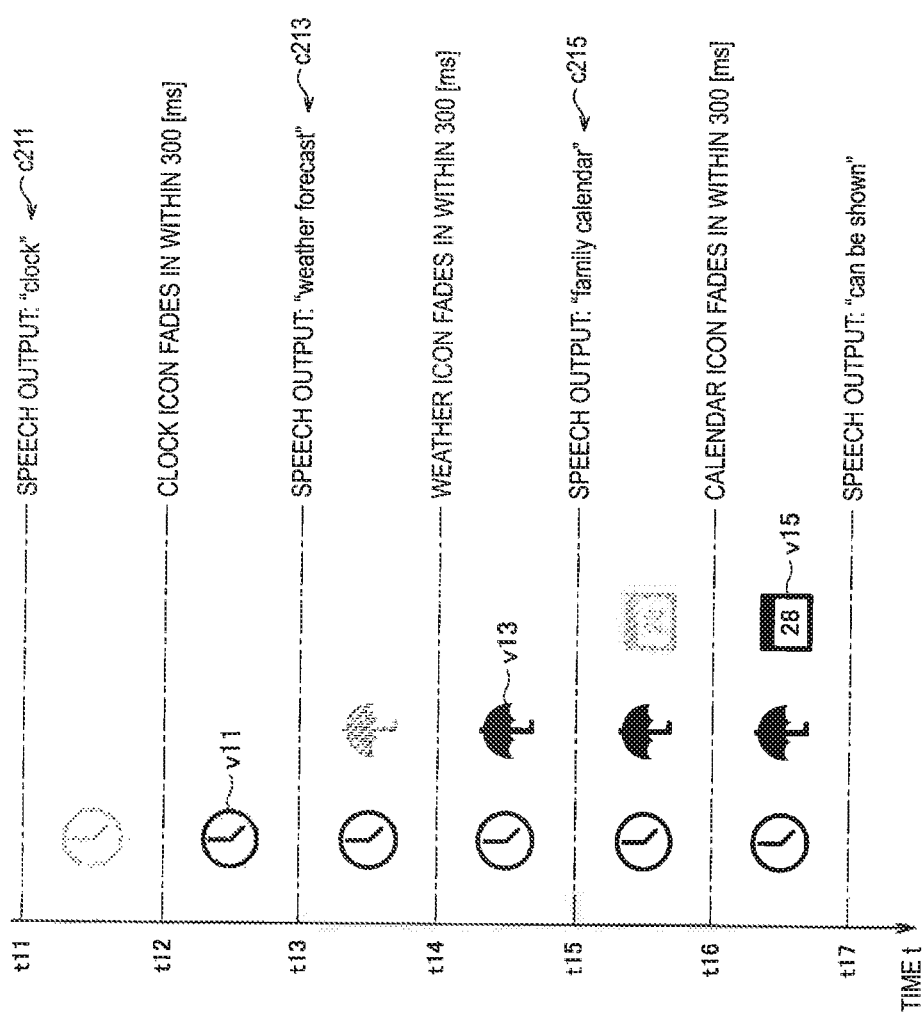
FIG. 3 is an explanatory diagram for describing an example of a method for the information processing device according to the embodiment to show information.

The flow of processing will be here described in chronological order with reference to FIG. 3 for the information processing device 10 to output speech information on each of the expressions c211 to c215 corresponding to the respective functions, and the display information v11, the display information v13, and the display information v15 related to the functions. FIG. 3 is an explanatory diagram for describing an example of a method for the information processing device 10 according to the present embodiment to show information.

For example, the information processing device 10 starts to output, as speech, the expression c211 indicating the function of "clock" and to fade in the display information v11 indicating the function of "clock" into the projection plane at the timing represented by a reference sign t11. The information processing device 10 then controls the output of the display information v11 so as to finish fading in the display information v11 a preset period (such as 300 [ms]) after the timing t11. Additionally, in FIG. 3, the period from the timing t11 to timing t12 corresponds to the period for which the information processing device 10 starts to fade in the display information v11 and finishes fading in the display information v11. In other words, the display information v11 has been shown in the projection plane by the timing t12.

Next, the information processing device 10 starts to output, as speech, the expression c213 indicating the function of "weather forecast" and to fade in the display information v13 indicating the function of "weather forecast" into the projection plane at the timing represented by a reference sign t13. The information processing device 10 then controls the output of the display information v13 so as to finish fading in the display information v13 a preset period (such as 300 [ms]) after the timing t13. Additionally, in FIG. 3, the period from the timing t13 to timing t14 corresponds to the period for which the information processing device 10 starts to fade in the display information v13 and finishes fading in the display information v11. In other words, the display information v11 and the display information v13 have been shown in the projection plane by the timing t14.

Similarly, the information processing device 10 starts to output, as speech, the expression c215 indicating the function of "family calendar" and to fade in the display information v15 indicating the function of "family calendar" into the projection plane at the timing represented by a reference sign t15. The information processing device 10 then controls the output of the display information v15 so as to finish fading in the display information v15 a preset period (such as 300 [ms]) after the timing t15. Additionally, in FIG. 3, the period from the timing t15 to timing t16 corresponds to the period for which the information processing device 10 starts to fade in the display information v15 and finishes fading in the display information v15. In other words, the display information v11, the display information v13, and the display information v15 have been shown in the projection plane by the timing t16.

The information processing device 10 then outputs, as speech, the remaining expressions, in other words, the expression c217 indicating the auxiliary phrase of "can be shown", that the information processing device 10 has not yet finished outputting as speech, at timing t17 at which the information processing device 10 finishes outputting the set of display information v11, display information v13, and display information v15. The information processing device 10 then terminates a set of responses to the speech input of "What can you do?" said by the user Ua.

Although the above describes an example in which the information processing device 10 projects display information onto the projection plane like a projector to display the display information on the projection plane, the components for displaying display information are not necessarily limited to the above-described components.

For example, as a component for displaying display information, a liquid crystal display (LCD) device, an organic light emitting diode (OLED) display, or the like may be applied. The area like the projection plane in FIG. 1 on which the information processing device 10 displays information will also be described simply as "display plane". If a liquid crystal display, an organic EL display device, or the like is applied as a component for displaying display information, the display panel of the display corresponds to the "display plane".

In this way, the information processing device 10 controls the output of the display information related to each function in synchronization with the speech output of the expression corresponding to the function, thereby allowing a user to intuitively recognize the display information corresponding to the function output as speech. The information processing device 10 according to the present embodiment will be then described in more detail.

<2. Functional Configuration>

First of all, an example of the functional configuration of the information processing device 10 according to the present embodiment will be described with reference to FIG. 4.

Figure 4:
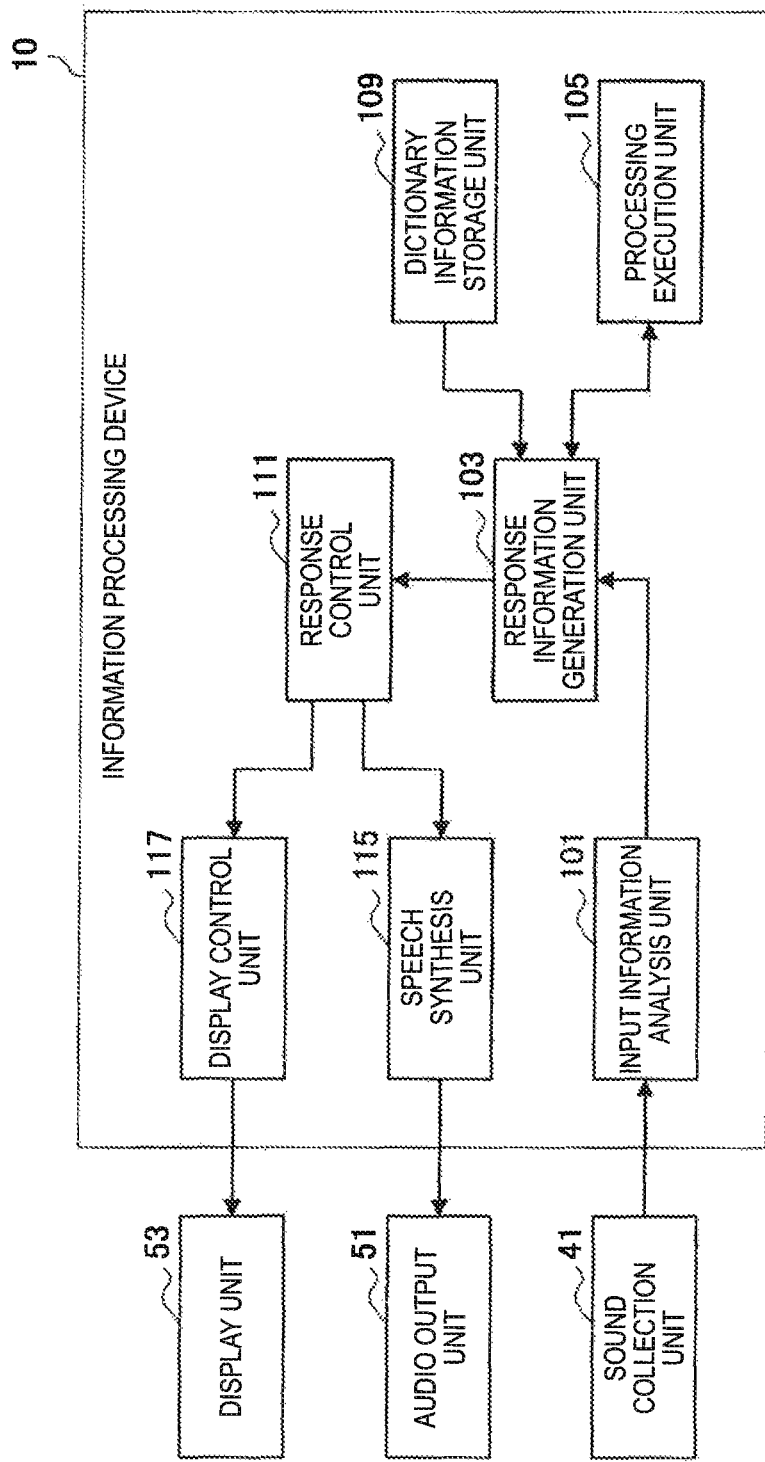
FIG. 4 is a block diagram illustrating a functional configuration of the information processing device according to the embodiment.

FIG. 4 is a block diagram illustrating the functional configuration of the information processing device 10 according to the present embodiment.

As illustrated in FIG. 4, the information processing device 10 according to the present embodiment includes an input information analysis unit 101, a response information generation unit 103, a processing execution unit 105, a dictionary information storage unit 109, a response control unit 111, a speech synthesis unit 115, and a display control unit 117. In addition, the information processing device 10 operates in cooperation with a sound collection unit 41, an audio output unit 51, and a display unit 53. Moreover, the information processing device 10 may include a part or all of the sound collection unit 41, the audio output unit 51, and the display unit 53. Each of the components that have been described above and are included in the information processing device 10 can be implemented by the hardware circuitry included in the information processing device 10.

The sound collection unit 41 can include a device such as a microphone capable of collecting the sounds of audio information. The sound collection unit 41 collects the sounds of speech information said by the user Ua as speech inputs, and consecutively outputs the collected sounds of speech inputs into the input information analysis unit 101.

The input information analysis unit 101 acquires the speech inputs of the user Ua the sounds of which have been consecutively output from the sound collection unit 41 and collected by the sound collection unit 41. The input information analysis unit 101 analyzes the acquired speech inputs on the basis of speech recognition technology, thereby converting the speech inputs into text information.

The input information analysis unit 101 conducts lexical analysis and syntactic analysis on the text information into which the speech inputs have been converted, thereby structuralizing the text information as data (such as syntax trees) in which each word included in the text information and the relationship (such as the modification relationship) between words are recognizably shown.

The input information analysis unit 101 then outputs the data (which will also be referred to as "structured data based on input information") in which text information is structuralized through the lexical analysis and the syntactic analysis to the response information generation unit 103. The input information analysis unit 101 may then output the structured data based on input information to the response information generation unit 103 in predetermined units (e.g. for each sentence included in the text information) based on a result of the syntactic analysis.

The response information generation unit 103 acquires the structured data based on input information from the input information analysis unit 101. The response information generation unit 103 conducts semantic analysis on the acquired structured data, thereby analyzing the semantic content of the speech inputs on which the structured data is based. The response information generation unit 103 then identifies the request content of the user Ua on the basis of a result of the analysis. It is recommended to store dictionary data for the response information generation unit 103 to conduct semantic analysis on the structured data, for example, in the dictionary information storage unit 109 in advance.

The dictionary information storage unit 109 stores, in advance, dictionary data for the response information generation unit 103 to conduct semantic analysis on the structured data.

The dictionary information storage unit 109 further stores management data d10 for the response information generation unit 103 to identify the content of a response (which will also be referred to as "response content") to the request content based on the input information. Moreover, if it is necessary to execute a predetermined function (application) in order to respond to the request content, the management data d10 may associate the predetermined function with the request content in advance.

For example, FIG. 5 is an explanatory diagram for describing an example of response content according to input information, and illustrates an example of the management data d10 stored in the dictionary information storage unit 109. As illustrated in FIG. 5, the management data d10 has request content d13, a corresponding function d15, and response content d17 associated with input information d11.

In FIG. 5, the input information d11 indicates an example of the content indicated by a speech input of the user Ua. The request content d13 indicates the request content of the user Ua indicated by the input information d11. The corresponding function d15 indicates a function necessary to be executed for a response to the request content d13. When there is no need to execute a predetermined function for the request content d13, no information has to be registered for the corresponding function d15. The response content d17 indicates the content of a response to the request content d13. In the example illustrated in FIG. 5, the response content d17 is defined as text information.

As a specific example, the input information d11 of "What can you do?" corresponds to the request content d13 indicating "check function". Accordingly, the request content d13 indicating "check function" is associated with the response content d17 of "Clock, weather forecast, family calendar can be shown" for showing the list of functions. Since there is no need to execute a predetermined function in the example illustrated in FIG. 5 when a response is made to the request content d13 indicating "check function", the corresponding function d15 is not associated. Needless to say, when a function executable by the information processing device 10 is fixed, the function of acquiring the list of executable functions (i.e. function of acquiring the list of applications) may be registered for the corresponding function d15 associated with the request content d13 indicating "check function".

As another example, the input information d11 of "What time is it in ○○?" corresponds to the request content d13 indicating "check time", and the request content d13 is associated with the function of "clock" as the corresponding function d15. The request content d13 indicating "check time" is associated with the response content d17 of "It is xx o'clock" for reporting the checked time. Part of information indicated by the response content d17 may be variable in a manner that an execution result of the function indicated by the corresponding function d15 can be embedded therein.

Similarly, the input information d11 of "How is the weather in △△?" corresponds to the request content d13 indicating "check weather forecast", and the request content d13 is associated with the corresponding function d15 indicating the function of "weather forecast" and the response content d17 of "It is sunny/rainy/cloudy". The input information d11 of "What is △△'s plan?" corresponds to the request content d13 indicating "check schedule", and the request content d13 is associated with the corresponding function d15 indicating the function of "family calendar" and the response content d17 of "△△ will do . . . at xx o'clock". The input information d11 of "△△ will . . . at xx o'clock" corresponds to the request content d13 indicating "register schedule", and the request content d13 is associated with the corresponding function d15 indicating the function of "family calendar" and the response content d17 of "The plan has been registered".

It is recommended to generate the management information d10 in advance on the basis of the possible pattern of conversation between the user Ua and the information processing device 10, and to store the generated management information d10 in the dictionary information storage unit 109. The information processing device 10 may learn from the past conversation between the user Ua and the information processing device 10, and add or update the content of the management information d10 stored in the dictionary information storage unit 109 on the basis of a learning result.

Based on such a configuration, the response information generation unit 103 compares the request content of the user Ua identified on the basis of a result of semantic analysis on the structured data with the management data d10, thereby acquiring the corresponding function d15 and the response content d17 associated with the request content.

The response information generation unit 103 then causes the processing execution unit 105 to execute the corresponding function d15 associated with the identified request content, and acquires a processing result of the corresponding function d15 from the processing execution unit 105.

The processing execution unit 105 is a component for executing a variety of functions (applications) of the information processing device 10. The processing execution unit 105 executes the function specified by the response information generation unit 103, and reports an execution result of the function to the response information generation unit 103, which is a requestor.

The response information generation unit 103 embeds the processing result of the corresponding function d15 reported from the processing execution unit 105 into the acquired response content d17, thereby deciding the response content d17 as response content d20 for the request content d13 of the user Ua. When the corresponding function d15 is not associated with the identified request content, the response information generation unit 103 decides the acquired response content d17 as the response content d20 for the request content d13 of the user Ua.

Once the response information generation unit 103 decides the response content d20 for the request content of the user Ua, the response information generation unit 103 embeds, into the response content d20, control information for controlling the output of other information shown with the speech output of the response content d20, thereby generating response information d30. Examples of the control over the output of other information shown with the speech output of the response content d20 in the present description include the control for displaying the display information v11, the display information v13, and the display information v15 corresponding to the respective functions so as to fade in the display information v11, the display information v13, and the display information v15 into the display plane, for example, as illustrated in FIGS. 2 and 3.

Figure 6:
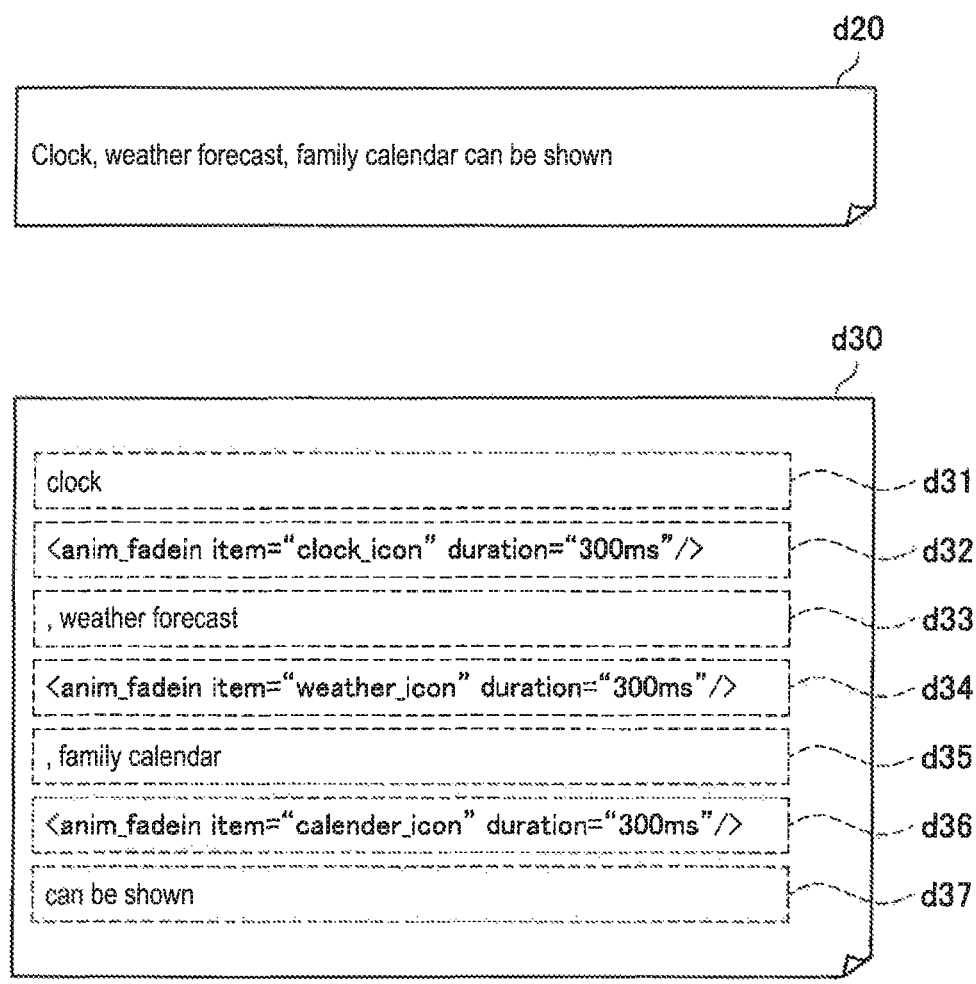
FIG. 6 is an explanatory diagram for describing an example of response information.

A specific example of the response information d30 will be described with reference to FIG. 6, in which a speech output and display information are coordinated as an example with each other to respond to "What can you do?" said by the user Ua as illustrated in FIGS. 2 and 3. FIG. 6 is an explanatory diagram for describing an example of the response information d30.

In FIG. 6, a reference sign d20 represents an example of the response content identified by the response information generation unit 103 for request content indicated by the input information based on "What can you do?" said by the user Ua. Meanwhile, a reference sign d30 represents an example of the response information obtained by embedding control information into the response content d20 to show the display information v11, the display information v13, and the display information v15 in coordination with the speech output of "Clock, weather forecast, family calendar can be shown" indicated by the response content d20 as illustrated in FIG. 3.

The expressions d31, d33, d35, and d37 respectively represented as "clock", ", weather forecast", ", family calendar", and "can be shown" in the response information d30 indicate the information that serves as a response and is output as speech, in other words, the respective expressions in the response content d20.

Reference signs d32, d34, and d36 are examples of control information for controlling showing the display information v11, the display information v13, and the display information v15. For example, the control information d32 indicates an example of control information for controlling the display of the display information v11 indicating "clock" in a manner that the display information v11 fades in into the display plane and the fade-in is finished within 300 [ms] as illustrated in FIGS. 2 and 3.

Specifically, an "anim_fadein" tag corresponds to the control information for displaying the display information specified in an "item" attribute in a manner that the display information fades in into the display plane. Additionally, in the example illustrated in FIG. 6, the period for which the display information is displayed so as to fade in is specified as a "duration" attribute for the "anim_fadein" tag.

Specifically, the control information d32 indicates that the display information v11 corresponding to the "clock" function indicated by "clock_icon" specified in the "item" attribute is displayed so as to fade in within the period specified in the "duration" attribute, in other words, "300 [ms]". Similarly, the control information d34 indicates that the display information v13 corresponding to the "weather forecast" function indicated by "weather_icon" is displayed so as to fade in within "300 [ms]". The control information d36 indicates that the display information v15 corresponding to the "family calendar" function indicated by "calendar_icon" is displayed so as to fade in within "300 [ms]".

In other words, the response information generation unit 103 inserts the control information d32 for showing the display information v11 corresponding to the "clock" function immediately after the expression d31 indicating the "clock" function in the response content d20, thereby associating the control information d32 with the expression d31. Similarly, the response information generation unit 103 inserts the control information d34 for showing the display information v13 corresponding to the "weather forecast" function immediately after the expression d33 indicating the "weather forecast" function, thereby associating the expression d33 with the control information d34. The response information generation unit 103 inserts the control information d36 for showing the display information v15 corresponding to the "family calendar" function immediately after the expression d35 indicating the "family calendar" function, thereby associating the expression d35 with the control information d36.

It is not necessarily the response information generation unit 103 that embeds the control information d32, the control information d34, and the control information d36 into the response content d20. As a specific example, the control information d32, the control information d34, and the control information d36 may be embedded into the response content d17 of the management information d10 (see FIG. 5) in advance as a template.

The response information generation unit 103 may also embed the corresponding control information in accordance with an execution result of the corresponding function d15 in deciding the response content d20 by embedding the execution result of the corresponding function d15 into the response content 17.

For example, when the request content d13 indicates "check weather forecast", the response information generation unit 103 causes the processing execution unit 105 to execute the "weather forecast" function associated with the request content d13 as the corresponding function d15. The response information generation unit 103 then acquires information indicating the weather from the processing execution unit 105 as an execution result of the "weather forecast" function.

As a specific example, when the response information generation unit 103 acquires the information indicating "sunny" as an execution result of the "weather forecast" function, the response information generation unit 10 decides the response content d20 of "It is sunny". The response information generation unit 103 then associates the control information for showing the display information indicating "sunny" with the expression of "sunny" in the response content d20. As another example, when the response information generation unit 103 acquires the information indicating "rainy" as an execution result of the "weather forecast" function, the response information generation unit 103 associates the control information for showing the display information indicating "rainy" with the expression of "rainy" in the response content d20 of "It is rainy".

As the example illustrated in FIG. 6, an example has been described in which control information is inserted into the response content d20 as a tag having an empty element (i.e. tag having "/" attached to the end thereof, which will also be referred to as "completion tag"), and the control information is hereby associated with an expression in the response content d20. Meanwhile, if control information is defined as tag information, control information is not necessarily limited to a completion tag. As a specific example, control information may be defined with a start tag (tag including no "/") and an end tag (tag having "/" attached to the head thereof). In this case, the start tag and the end tag indicating the control information encloses an expression in the response content d20 in a manner that the expression is an element of the control information.

If it is possible to embed control information into the response content d20 in association with an expression in the response content d20, the control information does not necessarily have to be tag information. For example, a predetermined letter is used as a so-called delimiter, and control information may be embedded into the response information d20 in a manner that the content of the response information d20 and the control information can be recognizably extracted.

As described above, the response information generation unit 103 generates the response information d30 for responding to the identified request content, and outputs the generated response information d30 to the response control unit 111.

The response control unit 111 acquires the response information d30 from the response information generation unit 103, and controls the operation of making a response to the user Ua, who is a requestor, from the information processing device 10 on the basis of the acquired response information d30. The following then describes the detailed operation of making a response on the basis of the response information d30 with an example in which the information processing device 10 responds to input information from the user Ua by outputting speech in coordination with showing display information as illustrated in FIGS. 2 and 3. A component in the response control unit 111 for acquiring the response information d30 from the response information generation unit 103 corresponds to an example of an "acquisition unit".

The response control unit 111 consecutively reads out the content of the acquired response information d30 from the head, and controls the operation of the speech synthesis unit 115 or the display control unit 117, which will be described below, in accordance with the type of read-out information. Specifically, when the read-out information indicates the response content, the response control unit 111 controls the operation of the speech synthesis unit 115 to output the information as speech. Meanwhile, if the read-out information is control information, the response control unit 111 controls the operation of the display control unit 117 on the basis of the control information to control the output of display information shown with a speech output.

The operation of the response control unit 111 will be described here in more detail with an example in which the response information d30 illustrated in FIG. 6 is a processing target.

First of all, the response control unit 111 reads out the content of the response information d30 until control information (tag information) is detected. When the response control unit 111 reads out the content of the response information d30 from the head in the example as illustrated in FIG. 6, the response control unit 111 first reads out the expression d31 of "clock", and then detects the control information d32 inserted immediately after the expression d31.

The response control unit 111 then outputs the read-out expression d31 of "clock" to the speech synthesis unit 115, and causes the speech synthesis unit 115 to output the speech information corresponding to the expression d31. The response control unit 111 also causes the display control unit 117 to output the display information v11 indicated by "clock_icon" on the basis of the content of the detected control information d32 in a manner that the display information v11 fades in within "300 ms".

Next, the response control unit 111 reads out the expression d33 of ", weather forecast", and detects the control information d34 inserted immediately after the expression d33.

In this case, the response control unit 111 outputs the read-out expression d33 of ", weather forecast" to the speech synthesis unit 115, and causes the speech synthesis unit 115 to output the speech information corresponding to the expression d33. The response control unit 111 also causes the display control unit 117 to output the display information v13 indicated by "weather_icon" on the basis of the content of the detected control information d34 in a manner that the display information v13 fades in within "300 ms".

Similarly, the response control unit 111 reads out the expression of ", family calendar", and detects the control information d36 inserted immediately after the expression d35.

The response control unit 111 then outputs the read-out expression d35 of ", family calendar" to the speech synthesis unit 115, and causes the speech synthesis unit 115 to output the speech information corresponding to the expression d35.

The response control unit 111 also causes the display control unit 117 to output the display information v15 indicated by "calender_icon" on the basis of the content of the detected control information d34 in a manner that the display information v13 fades in within "300 ms".

Finally, the response control unit 111 reads out the expression d37 of "can be shown", and detects the termination of the response information d30 after reading out the expression d37.

In this case, the response control unit 111 outputs the read-out expression d37 of "can be shown" to the speech synthesis unit 115, and causes the speech synthesis unit 115 to output the speech information corresponding to the expression d37. The response control unit 111 terminates the sequential control based on the response information d30 on the basis of the detection of the termination of the response information d30.

On the basis of the above-described control, the response control unit 111 controls the output in a manner that the display information indicating the corresponding function is shown in synchronization with the speech outputs of "clock", "weather forecast", and "family calendar" as described on the basis of FIGS. 2 and 3.

Next, the speech synthesis unit 115, the display control unit 117, the audio output unit 51, and the display unit 53 will be each described.

The speech synthesis unit 115 acquires information (such as text information) indicating response content shown as a speech output to the user Ua from the response control unit 111. The speech synthesis unit 115 creates speech signals that articulate the response content from the acquired information indicating the response content, for example, on the basis of speech synthesis technology. Additionally, the source audio signals for the speech synthesis unit 115 to generate speech signals from the acquired information indicating the response content are stored in advance at a position where the speech synthesis unit 115 can refer to the audio signals.

The speech synthesis unit 115 then causes the audio output unit 51 to output the generated speech signals as speech at the timing specified by the response control unit 111 on the basis of the control performed by the response control unit 111. The audio output unit 51 can be configured as an output device such as a so-called speaker for outputting audio signals and speech signals.

In addition, the display control unit 117 causes the display unit 53 to display the display information specified by the response control unit 111 at the timing and in the display manner specified by the response control unit 111 on the basis of the control performed by the response control unit 111. Additionally, the information indicating the timing (in other words, information for performing control on the basis of the timing) specified by the response control unit 111 corresponds to an example of the "timing information".

For example, it is assumed that the response control unit 111 instructs the display control unit 117 to show display information on the basis of the control information d32 illustrated in FIG. 6. In this case, the display control unit 117 causes the display unit 53 to display the display information v11 indicated by "clock_icon" at the timing specified by the response control unit 111 in a manner that the display information v11 fades in within "300 ms".

The display unit 53 is an example of an output device, and can be configured as a device that shows video to a user by projecting the video onto the display plane, for example, like a so-called projector. As another example, the display unit 53 may be a display device such as a liquid crystal display (LCD) device and an organic light emitting diode (OLED) display device. In addition, the display unit 53 may be a so-called head mount display (HMD) that is worn around the head of a user and keeps the display plane in front of the eyes of the user. As another example, the display unit 53 may also be an onboard display for a vehicle such as a so-called head up display (HUD) that shows information to a user by projecting video onto the windshield.

An example of the functional configuration of the information processing device 10 according to the present embodiment has been described so far with reference to FIGS. 4 to 6. The functional configuration of the information processing device 10 illustrated in FIG. 4 is merely an example. As long as each component is operable as described above, each component can be provided in any place.

As a specific example, the information processing device 10 may include a part or all of the sound collection unit 41, the audio output unit 51, and the display unit 53. Needless to say, the transmission paths for information between the information processing device 10, the sound collection unit 41, the audio output unit 51, and the display unit 53 are not limited in particular. As a specific example, the information processing device 10 may be configured as a server (such as a cloud server) on a network. In this case, the information processing device 10 configured as a server controls the outputs of speech information and display information from the device including the audio output unit 51 and the display unit 53 via a network such as the Internet. As a component (such as the component corresponding to the speech synthesis unit 115) that controls the output of speech information and a component (such as the component corresponding to the display control unit 117) that controls the output of display information are operable in cooperation with each other, these components may be provided on separate housings. As another example, at least a part of the components included in the information processing device 10 may be provided on an external device different from the information processing device 10.

The above describes an example in which display information is shown in coordination with the speech output indicating response content for a speech input. However, as long as other information different from the speech output of the expression corresponding to each function included in response content is shown in synchronization with the speech output corresponding to the function, the other information is not limited in particular in type and number.

As a specific example, the information processing device 10 may show not only the display information indicating each function in synchronization with the speech output of the expression indicating the function, but also the audio information (such as sound effects) indicating the function.

As another example, a light emitting unit such as a light emitting diode (LED) may emit light in synchronization with the speech output of the expression corresponding to each function. In this case, the information processing device 10 causes the light emitting unit to emit light as many times as the number of issuance times according to each function or in the light-emitting pattern according to each function in synchronization with the speech output of the expression corresponding to the function.

As long as information shown in synchronization with the speech output of the expression corresponding to each function is shown in synchronization with the speech output, the information shown in coordination with the speech output is not limited to visual information such as display information or auditory information such as speech information and audio information, but may be information that stimulates the sense of touch, smell, or taste. As a specific example, the information processing device 10 may show haptic information by vibrating the actuator installed in a controller or the like held by a user in synchronization with the speech output of the expression corresponding to each function. In this case, the information processing device 10 vibrates the actuator in the vibration pattern according to each function in synchronization with the speech output of the expression corresponding to the function.

The information processing device 10 may also show some types of information in combination in synchronization with a speech output by, for example, outputting the corresponding display information and audio information. When the information processing device 10 controls the output of the corresponding display information in synchronization with the speech output, the information processing device 10 may control the output of other display information so as to more emphasize the output of the display information. As a specific example, it is assumed that the information processing device 10 displays display information as an animation, the display information being displayed on the display plane while the information processing device 10 is waiting for a speech input from a user. In this case, the information processing device 10 may stop the animation of the other information when the information processing device 10 displays the display information corresponding to the speech output as an animation so as to more emphasize the display information in responding to the speech input from the user.

<3. Processing>

Figure 7:
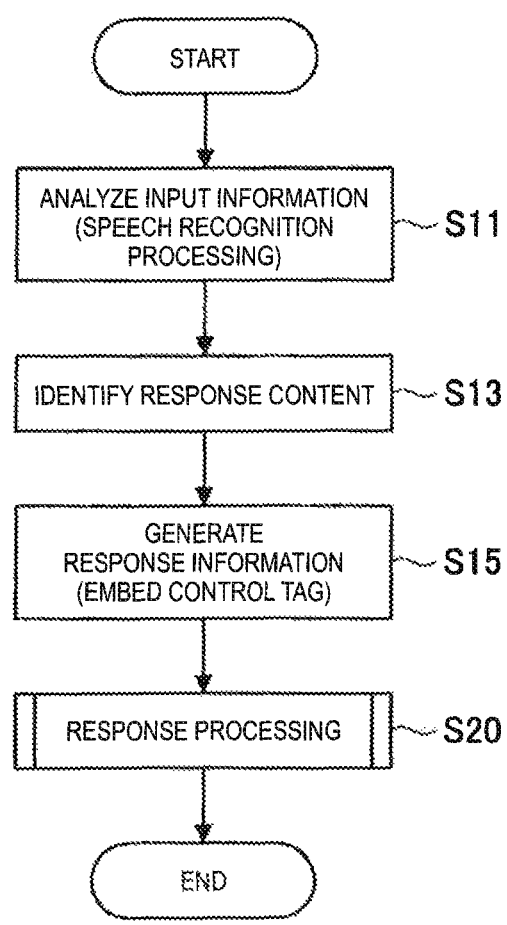
FIG. 7 is a flowchart illustrating an example of a set of operations of the information processing device according to the embodiment.

Next, a set of operations of the information processing device 10 according to the present embodiment will be described with reference to FIG. 7. FIG. 7 is a flowchart illustrating an example of a set of operations of the information processing device 10 according to the present embodiment.

(Step S11)

The input information analysis unit 101 acquires the speech inputs of the user Ua the sounds of which have been consecutively output from the sound collection unit 41 and collected by the sound collection unit 41. The input information analysis unit 101 analyzes the acquired speech inputs on the basis of speech recognition technology, thereby converting the speech inputs into text information.

The input information analysis unit 101 conducts lexical analysis and syntactic analysis on the text information into which the speech inputs have been converted, thereby structuralizing the text information as data (such as syntax trees) in which each word included in the text information and the relationship (such as the modification relationship) between words are recognizably shown.

The input information analysis unit 101 then outputs the structured data based on input information in which text information is structuralized through the lexical analysis and the syntactic analysis to the response information generation unit 103. The input information analysis unit 101 may then output the structured data based on input information to the response information generation unit 103 in structuralization units (e.g. for each sentence included in the text information) based on a result of the syntactic analysis.

(Step S13)

The response information generation unit 103 acquires the structured data based on input information from the input information analysis unit 101. The response information generation unit 103 conducts semantic analysis on the acquired structured data, thereby analyzing the semantic content of the speech inputs on which the structured data is based. The response information generation unit 103 then identifies the request content of the user Ua on the basis of a result of the analysis.

The response information generation unit 103 then compares the request content of the user Ua identified on the basis of a result of semantic analysis on the structured data with the management data d10 stored in the dictionary information storage unit 109. The response information generation unit 103 hereby acquires the corresponding function d15 and the response content d17 associated with the identified request content of the user Ua.

The response information generation unit 103 causes the processing execution unit 105 to execute the corresponding function d15 associated with the identified request content, and acquires a processing result of the corresponding function d15 from the processing execution unit 105.

The response information generation unit 103 embeds the processing result of the corresponding function d15 reported from the processing execution unit 105 into the acquired response content d17, thereby deciding the corresponding function d15 as response content d20 for the request content d13 of the user Ua. When the corresponding function d15 is not associated with the identified request content, the response information generation unit 103 decides the acquired response content d17 as the response content d20 for the request content d13 of the user Ua.

As a specific example, the response information generation unit 103 identifies the response content d20 of "Clock, weather forecast, family calendar can be shown" for the request content indicated by the input information based on "What can you do?" said by the user Ua as illustrated in FIG. 6.
(Step S15)

Next, the response information generation unit 103 embeds the control information for controlling the output of other information shown with the speech output of the identified response content d20 into the response content d20 in association with the corresponding expressions in the response content d20, thereby generating the response information d30.

For example, in the example illustrated in FIG. 6, the response information generation unit 103 inserts the control information d32 for showing the display information v11 corresponding to the "clock" function immediately after the expression d31 of "clock" in the response content d20, thereby associating the expression d31 with the control information d32. Similarly, the response information generation unit 103 inserts the control information d34 for showing the display information v13 corresponding to the "weather forecast" function immediately after the expression d33 of "weather forecast", thereby associating the expression d33 with the control information d34. The response information generation unit 103 inserts the control information d36 for showing the display information v15 corresponding to the "family calendar" function immediately after the expression d35 of "family calendar", thereby associating the expression d35 with the control information d36.

As described above, the response information generation unit 103 generates the response information d30 for responding to the identified request content, and outputs the generated response information d30 to the response control unit 111.
(Step S20)

Figure 8:
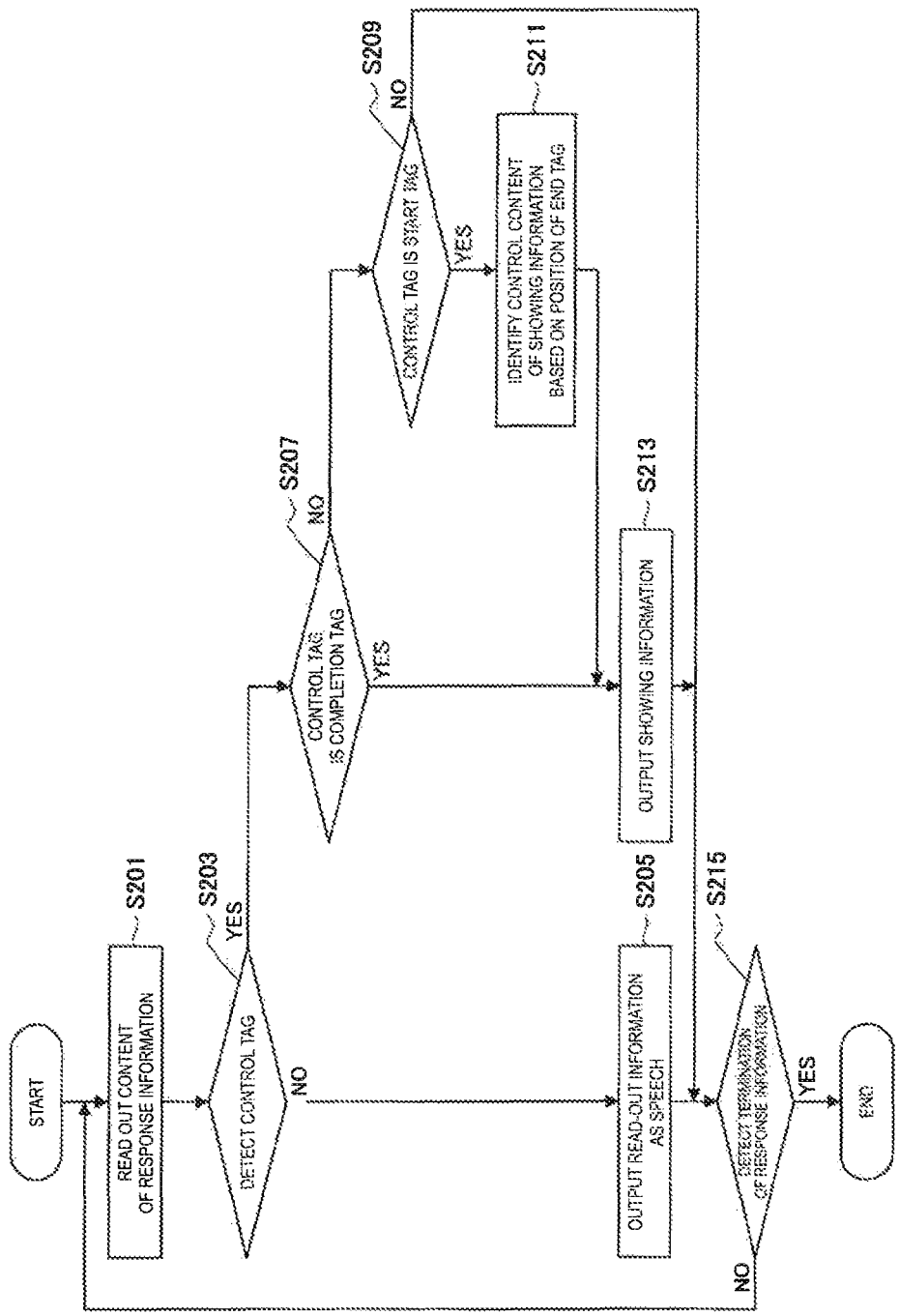
FIG. 8 is a flowchart illustrating an example of a flow of response processing of the information processing device according to the embodiment.

The response control unit 111 acquires the response information d30 from the response information generation unit 103, and controls the operation of making a response to the user Ua, who is a requestor, from the information processing device 10 on the basis of the acquired response information d30. With reference to FIG. 8, the following then describes an example of the flow of the response processing based on the control performed by the response control unit 111, which is illustrated in step S20 of FIG. 7. FIG. 8 is a flowchart illustrating an example of the flow of the response processing of the information processing device 10 according to the present embodiment.
(Steps S201 and S203)

The response control unit 111 consecutively reads out the content of the acquired response information d30 from the head, and controls the operation of the speech synthesis unit 115 or the display control unit 117, which will be described below, in accordance with the type of read-out information. Specifically, the response control unit 111 reads out the content of the response information d30 until control information (tag information) is detected.
(Step S203)

The response control unit 111 outputs information (expressions) read out until control information is detected (step S203, NO) to the speech synthesis unit 115 as information indicating the response content shown to the user Ua as a speech output.
(Step S205)

The speech synthesis unit 115 acquires information (such as text information) indicating response content shown as a speech output to the user Ua from the response control unit 111. The speech synthesis unit 115 creates speech signals that articulate the response content from the acquired information indicating the response content, for example, on the basis of speech synthesis technology.

The speech synthesis unit 115 then causes the audio output unit 51 to output the generated speech signals as speech at the timing specified by the response control unit 111 on the basis of the control performed by the response control unit 11.
(Steps S203 and S207)

Once the response control unit 111 detects control information (step S203, YES), the response control unit 111 checks whether or not the control information is a completion tag having an empty element (step S207).
(Steps S207 and S213)

If the detected control information is a completion tag (step S207, YES), the response control unit 111 identifies display information serving as a control target and the control content for showing the display information on the basis of the type of control information (such as the type of tag information) and the content specified as attribute information.

As a specific example, the response control unit 111 identifies the display mode of the display information (such as the mode in which the display information is displayed so as to fade in) on the basis of the type of control information. The response control unit 111 also identifies display information (such as the display information v11 indicating the "clock" function) serving as a display target and the detailed control content (such as the period for which the display information is displayed so as to fade in) of the display mode on the basis of the attribute information.

The response control unit 111 then controls the operation of the display control unit 117 in accordance with the display information identified on the basis of the detected control information and the control content for showing the display information, thereby controlling the output of the display information shown with the speech output.

(Steps S207 and S209)

To the contrary, if the detected control information is not a completion tag (step S207, NO), the response control unit 111 checks whether or not the control information is a start tag (step S209).

(Step S211)

If the detected control information is a start tag, the response control unit 111 detects the end tag that is embedded after the start tag and corresponds to the start tag. The response control unit 111 then identifies display information serving as a control target and the control content for showing the display information in accordance with the length of the element (i.e. expression indicating the response content shown as a speech output) enclosed by the start tag and the end tag in addition to the type of control information and the content specified as attribute information.

As a specific example, the response control unit 111 may determine the period for which the display of the display information is controlled, in accordance with the length of the expression enclosed by the start tag and the end tag. Such a configuration allows, for example, the response control unit 111 to perform control in a manner that the display information v11 corresponding to the "clock" function fades in synchronization with the period for which the expression of "clock" is output as speech. This mode will be discussed below as an Example.

The response control unit 111 then controls the operation of the display control unit 117 in accordance with the display information identified on the basis of the detected control information and the control content for showing the display information, thereby controlling the output of the display information shown with the speech output.

If the detected control information is not a start tag, in other words, the detected control information is an end tag (step S209, NO), the response control unit 111 does not have to treat the control information as a control target. This is because when the response control unit 111 detected the start tag corresponding to an end tag before detecting the end tag, the response control unit 111 controlled the output of the corresponding display information.

(Step S215)

The response control unit 111 continues the above-described processing until the termination of the response information d30 is detected (step S215, NO). The response control unit 111 terminates the sequential control based on the response information d30 on the basis of the detection of the termination of the response information d30 (step S215, YES).

The above describes an example of the flow of the sequential processing of the information processing device 10 according to the present embodiment with reference to FIGS. 7 and 8.

<4. Examples>

Next, Examples of the information processing device 10 according to the present embodiment will be described.

4.1. Example 1

Example of Method of Showing Display Information

First of all, an example of a method of showing display information in coordination with a speech output will be described as an Example 1 along with an example of response information.

Figure 9:
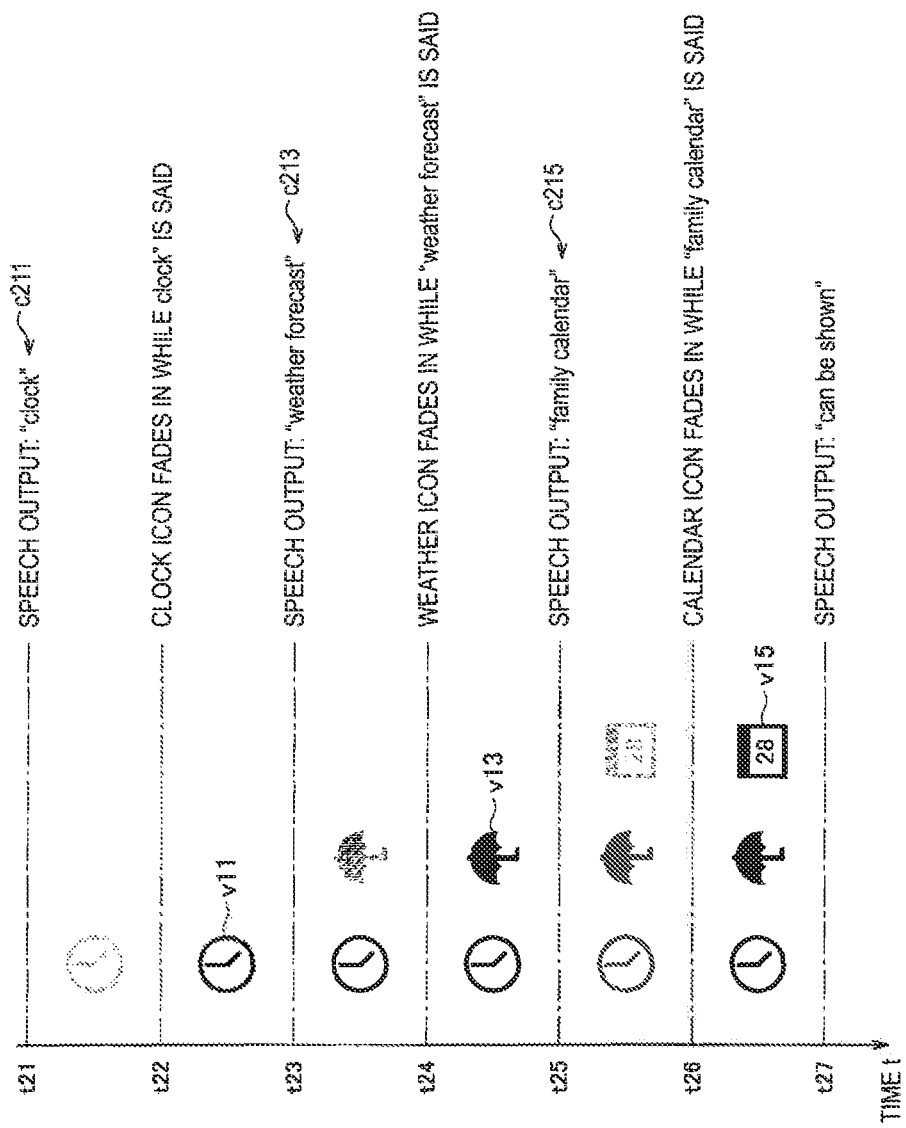
FIG. 9 is an explanatory diagram for describing an example of a method for an information processing device according to an Example 1 to show information.

For example, FIG. 9 is an explanatory diagram for describing an example of a method for the information processing device 10 according to the Example 1 to show information. In the example discussed with reference to FIG. 3, the information processing device 10 explicitly specifies the period (such as the period for fade-in) for which not only the display mode of the content of an expression to be output as speech, but also the display mode of the corresponding display information are controlled. In contrast, the information processing device 10 according to a modification 1 illustrated in FIG. 9 controls the display mode of the display information corresponding to a function in synchronization with the period for which the expression corresponding to the function is output as speech.

Similarly to the example illustrated in FIG. 3, the example illustrated in FIG. 9 illustrates that the information processing device 10 responds to the speech input of "What can you do?" said by the user Ua on the basis of the speech output of "Clock, weather forecast, family calendar can be shown".

As illustrated in FIG. 9, the information processing device 10 according to the Example 1 starts to output, as speech, the expression c211 indicating the function of "clock" and to fade in the display information v11 indicating the function of "clock" into the display plane at the timing represented by a reference sign t21. The information processing device 10 then finishes fading in the display information v11 into the display plane, synchronizing with timing t22 at which the information processing device 10 finishes the speech output of the expression c211 indicating the function of "clock". In other words, the information processing device 10 according to the present embodiment controls the display of the display information v11 indicating the function of "clock" in a manner that the display information v11 fades in into the display plane of the display information v11 in synchronization with the period for which the expression c211 indicating the function of "clock" is output as speech.

Next, the information processing device 10 starts to output, as speech, the expression c213 indicating the function of "weather forecast" and to fade in the display information v13 indicating the function of "weather forecast" into the display plane at the timing represented by a reference sign t23. The information processing device 10 then finishes fading in the display information v13 into the display plane, synchronizing with timing t24 at which the information processing device 10 finishes the speech output of the expression c213 indicating the function of "weather forecast". In other words, the information processing device 10 according to the present embodiment controls the display of the display information v13 indicating the function of "weather forecast" in a manner that the display information v13 fades in into the display plane of the display information v13 in synchronization with the period for which the expression c213 indicating the function of "weather forecast" is output as speech.

Similarly, the information processing device 10 starts to output, as speech, the expression c215 indicating the function of "family calendar" and to fade in the display information v15 indicating the function of "family calendar" into the display plane at the timing represented by a reference sign t25. The information processing device 10 then finishes fading in the display information v15 into the display plane, synchronizing with timing t26 at which the information processing device 10 finishes the speech output of the expression c215 indicating the function of "family calendar". In other words, the information processing device 10 according to the present embodiment controls the display of the display information v15 indicating the function of "family calendar" so as to fade in into the display plane of the display information v15 in synchronization with the period for which the expression c215 indicating the function of "family calendar" is output as speech.

The information processing device 10 then outputs, as speech, the expression c217 indicating the auxiliary phrase of "can be shown" at the timing t17, at which the information processing device 10 finishes the speech output of the expression c215 indicating the function of "family calendar" and the output of the display information v15 indicating the function of "family calendar". The information processing device 10 according to the Example 1 then terminates a set of responses to the speech input of "What can you do?" said by the user Ua.

Figure 10:
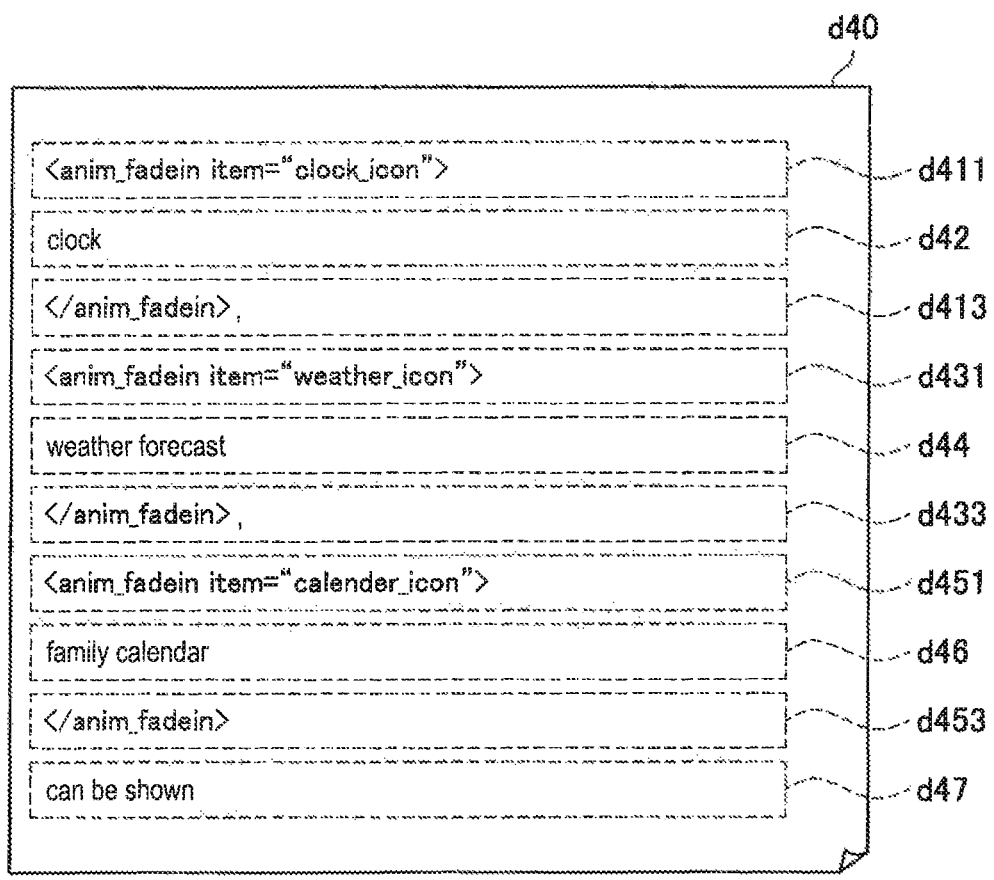
FIG. 10 is an explanatory diagram for describing an example of response information according to the Example 1.

Next, a description will be made, with reference to FIG. 10, for an example of the response information for the information processing device 10 according to the Example 1 to control the output of the display information corresponding to each function in synchronization with the period for which the expression corresponding to the function is output as speech as illustrated in FIG. 9, and an example of the operation based on the response information. FIG. 10 is an explanatory diagram for describing an example of response information according to the Example 1, and illustrates the response information in the example illustrated in FIG. 9.

In FIG. 10, a reference sign d40 represents an example of the response information into which the control information for showing the display information v11, the display information v13, and the display information v15 is embedded for the response content d20 of "Clock, weather forecast, family calendar can be shown".

The expressions d42, d44, d46, and d47 respectively represented as "clock", ", weather forecast", ", family calendar", and "can be shown" in the response information d30 indicate the information that serves as a response and is output as speech, in other words, the respective expressions in the response content d20.

Reference signs d411, d413, d431, d433, d451, and d453 are examples of control information for controlling showing the display information v11, the display information v13, and the display information v15. Additionally, the control information d411, the control information d431, and the control information d451 each correspond to control information configured as a start tag. Meanwhile, the control information d413, the control information d433, and the control information d453 respectively indicate the end tags of the control information d411, the control information d431, and the control information d453 configured as start tags.

For example, the control information d411 and the control information d413 each indicate an example of control information for controlling the display of the display information v11 indicating "clock" in a manner that the display information v11 fades in into the display plane in synchronization with the period for which the expression d42 indicating "clock" is output as speech. In other words, in the example illustrated in FIG. 10, inserting the control information d411 and the control information d413 to enclose the expression indicating "clock" allows the control information d411 and the control information d413 to indicate the period for which the expression d42 is output as speech.

Similarly, the control information d431 and the control information d433 each indicate an example of control information for controlling the display of the display information v13 indicating "weather forecast" in a manner that the display information v13 fades in into the display plane in synchronization with the period for which the expression d44 indicating "weather forecast" is output as speech. The control information d451 and the control information d453 each indicate an example of control information for controlling the display of the display information v15 indicating "family calendar" in a manner that the display information v15 fades in into the display plane in synchronization with the period for which the expression d46 indicating "family calendar" is output as speech.

Next, an example of response processing performed by the response control unit 111 will be described which is based on the response information d40 illustrated in FIG. 10.

Similarly to the above-described embodiment, the response control unit 111 consecutively reads out the content of the acquired response information d40 from the head, and controls the operation of the speech synthesis unit 115 or the display control unit 117 in accordance with the type of read-out information.

For example, when the response control unit 111 detects the control information d41 configured as a start tag, the response control unit 111 searches for the end tag corresponding to the control information d411, in other words, the control information d413. The response control unit 111 then calculates the period for controlling the display of the display information v11 indicated by "clock_icon" on the basis of the length of the expression, on other words, the expression d42 indicating the "clock", enclosed by the control information d411 (start tag) and the control information d413 (end tag).

Additionally, the relationship between the length of the expression enclosed by the start tag and the end tag and the length of the period for controlling the display of the display information is calculated to generate control data on the basis of an experiment or the like in advance, and the generated control data is stored at a position where the response control unit 111 can read out the control data. This allows the response control unit 111 to calculate the period according to the length of the expression enclosed by the start tag and the end tag on the basis of the control data.

The response control unit 111 causes the display control unit 117 to output the display information v11 on the basis of the content of the control information d411 and the period calculated on the basis of the control information d411 and the control information d413 in a manner that the display information v11 fades in into the screen. Following the control information d411, the response control unit 111 reads out the expression d42 indicating "clock", outputs the expression d42 to the speech synthesis unit 115, and causes the speech synthesis unit 115 to output the speech information corresponding to the expression d41.

Such a configuration allows the response control unit 111 to control the display of the display information v11 indicating "clock" in a manner that the display information v11 fades in into the screen in synchronization with the period for which the expression d42 indicating "clock" is output as speech.

The above-described control is similarly performed on the basis of the control information d431 and the control information d433, and the control information d451 and the control information d453. In other words, the response control unit 111 controls the display of the display information v13 indicating "weather forecast" on the basis of the control information d431 and the control information d433 in a manner that the display information v13 fades in into the screen in synchronization with the period for which the expression d44 indicating "weather forecast" is output as speech. Similarly, the response control unit 111 controls the display of the display information v15 indicating "family calendar" on the basis of the control information d451 and the control information d453 in a manner that the display information v15 fades in into the screen in synchronization with the period for which the expression d46 indicating "family calendar" is output as speech.

As described above with reference to FIGS. 9 and 10, the information processing device 10 according to the Example 1 makes it possible to control the display mode of the display information corresponding to a function in synchronization with the period for which the expression corresponding to the function is output as speech.

4.2. Example 2

Example of Method of Showing Display Information

In the above-described embodiment and Example, an example has been described in which the information processing device 10 controls the display mode so as to fade in the display information corresponding to each function into the display plane in synchronization with the speech output of the expression corresponding to the function. Meanwhile, if the output of other information (such as display information) is controlled in synchronization with the speech output, the mode for outputting the other information is not necessarily limited to the method demonstrated in the above-described embodiment and Example.

Figure 11:
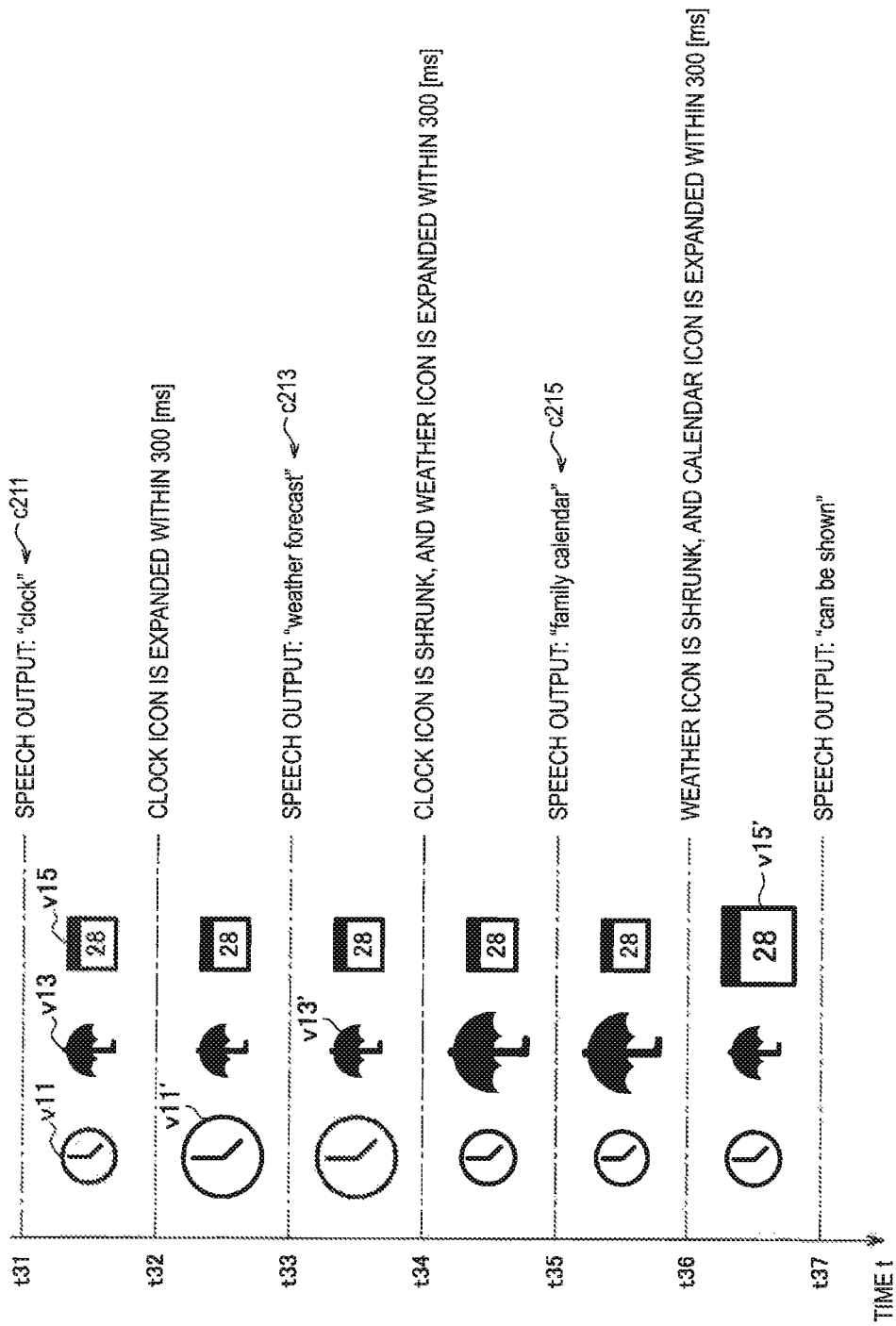
FIG. 11 is an explanatory diagram for describing an example of a method for an information processing device according to an Example 2 to show information.
Figure 12:
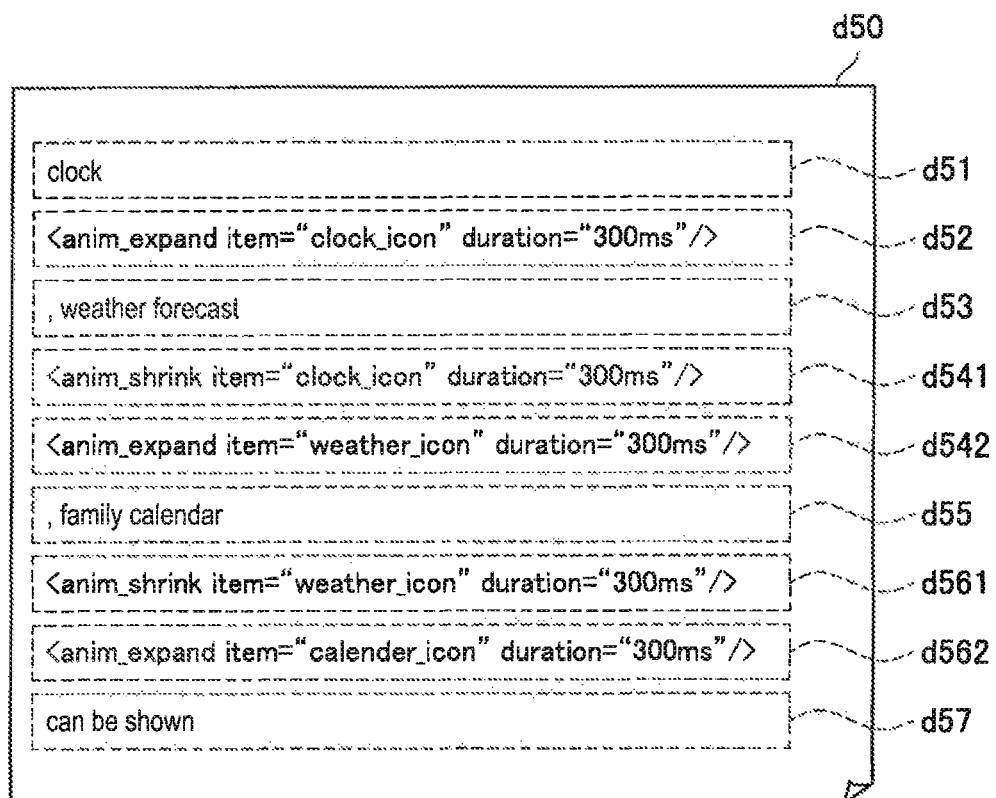
FIG. 12 is an explanatory diagram for describing an example of response information according to the Example 2.

The following then describes, as an Example 2, another example of a method of showing display information in coordination with a speech output with reference to FIGS. 11 and 12. FIG. 11 is an explanatory diagram for describing an example of a method for the information processing device 10 according to the Example 2 to show information. FIG. 12 is an explanatory diagram for describing an example of response information according to the Example 2, and illustrates the response information in the example illustrated in FIG. 11.

Similarly to the examples illustrated in FIGS. 3 and 9, the example illustrated in FIG. 11 illustrates that the information processing device 10 responds to the speech input of "What can you do?" said by the user Ua on the basis of the speech output of "Clock, weather forecast, family calendar can be shown". Meanwhile, the example illustrated in FIG. 11 is different from the examples illustrated in FIGS. 3 and 9 in that the display information v11, the display information v13, and the display information v15 respectively corresponding to "clock", "weather forecast", and "family calendar" are displayed in advance in the example illustrated in FIG. 11.

As illustrated in FIG. 11, the information processing device 10 according to the Example 2 starts the speech output of the expression c211 indicating the function of "clock" at the timing represented by a reference sign t31, and starts to perform display control (which will also be referred to as "expansion") to expand the display information v11 in synchronization with the start of the speech output. The information processing device 10 then controls the output of the display information v11 so as to finish the expansion of the display information v11 a preset period (such as 300 [ms]) after the timing t11.

Additionally, in FIG. 11, the period from the timing t31 to timing t32 corresponds to the period for which the information processing device 10 starts the expansion of the display information v11, and then finishes the expansion of the display information v11. In other words, the display information v11 has been expanded by the timing t12. The expanded display information v11 will also be referred to as "display information v11'" to distinguish the expanded display information v11 from the display information v11 that has not yet been expanded.

Next, the information processing device 10 starts the speech output of the expression c213 indicating the function of "weather forecast" at the timing represented by a reference sign t33. The information processing device 10 then starts the expansion of the display information v13 and to perform display control to shrink (which will also be referred to as "shrinkage") the display information v11' to the size prior to the expansion in synchronization with the start of the speech output. The information processing device 10 controls the outputs of the display information v13 and the display information v11' in a manner that the information processing device 10 finishes the expansion of the display information v13 and the shrinkage of the display information v11' a preset period (such as 300 [ms]) after the timing t33.

Additionally, in FIG. 11, the period from the timing t33 to timing t34 corresponds to the period for which the information processing device 10 starts the expansion of the display information v13 and the shrinkage of the display information v11', and then finishes the expansion of the display information v13 and the shrinkage of the display information v11'. In other words, the display information v13 has been expanded and the display information v11' has been shrunk to the size prior to the expansion (i.e. the display information v11 has been displayed) by the timing t14. The expanded display information v13 will also be referred to as "display information v13'" to distinguish the expanded display information v13 from the display information v13 that has not yet been expanded.

Next, the information processing device 10 starts the speech output of the expression c215 indicating the function of "family calendar" at the timing represented by a reference sign t35. The information processing device 10 then starts the expansion of the display information v15 and the shrinkage of the display information v13' in synchronization with the start of the speech output. The information processing device 10 controls the outputs of the display information v15 and the display information v13' in a manner that the information processing device 10 finishes the expansion of the display information v15 and the shrinkage of the display information v13' a preset period (such as 300 [ms]) after the timing t35.

Additionally, in FIG. 11, the period from the timing t35 to timing t36 corresponds to the period for which the information processing device 10 starts the expansion of the display information v15 and the shrinkage of the display information v13', and then finishes the expansion of the display information v15 and the shrinkage of the display information v13'. In other words, the display information v15 has been expanded and the display information v13' has been shrunk to the size prior to the expansion (i.e. the display information v13 has been displayed) by the timing t16. The expanded display information v15 will also be referred to as "display information v15'" to distinguish the expanded display information v15 from the display information v15 that has not yet been expanded.

The information processing device 10 then outputs, as speech, the remaining expressions, in other words, the expression c217 indicating the auxiliary phrase of "can be shown", that the information processing device 10 has not yet finished outputting as speech, at timing t17 at which the information processing device 10 finishes outputting the set of display information v11, display information v13, and display information v15. The information processing device 10 then terminates a set of responses to the speech input of "What can you do?" said by the user Ua.

Next, a description will be made, with reference to FIG. 12, for an example of the response information for the information processing device 10 according to the Example 2 to control the output of the display information corresponding to each function in synchronization with the period for which the expression corresponding to the function is output as speech as illustrated in FIG. 11, and an example of the operation based on the response information.

In FIG. 10, a reference sign d50 represents an example of the response information into which the control information for showing the display information v11, the display information v13, and the display information v15 is embedded for the response content d20 of "Clock, weather forecast, family calendar can be shown".

The expressions d51, d53, d55, and d57 respectively represented as "clock", ", weather forecast", ", family calendar", and "can be shown" in the response information d50 indicate the information that serves as a response and is output as speech, in other words, the respective expressions in the response content d20.

Reference signs d52, d541, d542, d561, and d562 are examples of control information for controlling showing the display information v11, the display information v13, and the display information v15.

For example, the "anim_expand" tags indicated by the control information d52, the control information d541, and the control information d561 each correspond to control information for expanding the display information specified in the "item" attribute. Additionally, in the example illustrated in FIG. 12, the period for which the display information is expanded is specified as a "duration" attribute for the "anim_expand" tag.

The "anim_shrink" tags indicated by the control information d542 and the control information d562 each correspond to control information for shrinking the display information specified in the "item" attribute. Additionally, in the example illustrated in FIG. 12, the period for which the display information is shrunk is specified as a "duration" attribute for the "anim_shrink" tag.

Next, an example of response processing performed by the response control unit 111 will be described which is based on the response information d50 illustrated in FIG. 12.

Similarly to the above-described embodiment, the response control unit 111 consecutively reads out the content of the acquired response information d40 from the head, and controls the operation of the speech synthesis unit 115 or the display control unit 117 in accordance with the type of read-out information.

In the example illustrated in FIG. 12, the response control unit 111 first reads out the expression d51 of "clock", and detects the control information d52 inserted immediately after the expression d51.

The response control unit 111 then outputs the read-out expression d51 of "clock" to the speech synthesis unit 115, and causes the speech synthesis unit 115 to output the speech information corresponding to the expression d51. The response control unit 111 causes the display control unit 117 to control the output of the display information v11 indicated by "clock_icon" on the basis of the content of the detected control information d52 in a manner that the display information v11 is expanded within "300 ms".

Next, the response control unit 111 reads out the expression d53 of ", weather forecast", and detects the control information d541 and the control information d542 inserted immediately after the expression d33.

In this case, the response control unit 111 outputs the read-out expression d53 of ", weather forecast" to the speech synthesis unit 115, and causes the speech synthesis unit 115 to output the speech information corresponding to the expression d53. The response control unit 111 causes the display control unit 117 to control the output of the display information v11 indicated by "clock_icon" on the basis of the content of the detected control information d541 in a manner that the display information v11 is shrunk within "300 ms". In this case, the display information v11 (i.e. display information v11') expanded on the basis of the control information d52 is shrunk to the size prior to the expansion within "300 ms". The response control unit 111 causes the display control unit 117 to control the output of the display information v13 indicated by "weather_icon" on the basis of the content of the detected control information d542 in a manner that the display information v13 is expanded within "300 ms".

Similarly, the response control unit 111 reads out the expression of ", family calendar", and detects the control information d561 and the control information d562 inserted immediately after the expression d55.

In this case, the response control unit 111 then outputs the read-out expression d55 of ", family calendar" to the speech synthesis unit 115, and causes the speech synthesis unit 115 to output the speech information corresponding to the expression d55. The response control unit 111 causes the display control unit 117 to control the output of the display information v11 indicated by "weather_icon" on the basis of the content of the detected control information d561 in a manner that the display information v13 is shrunk within "300 ms". In this case, the display information v13 (i.e. display information v13') expanded on the basis of the control information d542 is shrunk to the size prior to the expansion within "300 ms". The response control unit 111 causes the display control unit 117 to control the output of the display information v15 indicated by "calender_icon" on the basis of the content of the detected control information d562 in a manner that the display information v15 is expanded within "300 ms".

Finally, the response control unit 111 reads out the expression d57 of "can be shown", and detects the termination of the response information d50 after reading out the expression d57.

In this case, the response control unit 111 outputs the read-out expression d57 of "can be shown" to the speech synthesis unit 115, and causes the speech synthesis unit 115 to output the speech information corresponding to the expression d57. The response control unit 111 terminates the sequential control based on the response information d50 on the basis of the detection of the termination of the response information d50.

As described above with reference to FIGS. 11 and 12, the information processing device 10 may, as described as the Example 2, control the display mode of the display information corresponding to a function in a manner that the display information is expanded in synchronization with the speech output of the expression corresponding to the function.

The above demonstrates merely an example. As long as the output of other information different from the speech output of the expression corresponding to each function in the response content is controlled in synchronization with the speech output, the mode for outputting the other information is not limited as discussed above. Furthermore, if other information different from the speech output is shown to a user in synchronization with the speech output, the other information is not either limited in type.

For example, FIG. 13 is a diagram illustrating an example of control information that can be defined by response information. The example illustrated in FIG. 13 illustrates control information for controlling "displaying display information as an animation", "blinking or turning on an LED", and "yielding sound feedback using an audio output (such as sound effects)" in synchronization with a speech output.

As a specific example, examples of the control for displaying display information as an animation include "making the display information visible/invisible", "fading in/fading out the display information", "expanding/shrinking the display information", "blinking the display information", "moving the display information", and "scrolling the display information". In addition, as a parameter for executing each kind of control, the "time", the "number of times", or the like may be specified.

Examples of the control for blinking or turning on an LED include "turning on/turning off the LED", "fading in/fading out the LED", and "blinking the LED". In addition, as a parameter for executing each kind of control, the "color", the "time", the "number of times", or the like may be specified.

Examples of the control for yielding sound feedback using an audio output include "reproducing the audio output", "stopping the audio output", "fading in/fading out the audio output", and "setting the volume of the audio output". In addition, as a parameter for executing each kind of control, the "sound (output target)", the "time", the "number of times", or the like may be specified.

Needless to say, as discussed above, not only so-called visual information and auditory information as illustrated in FIG. 13, but information that, for example, stimulates the sense of touch, smell, or taste may also be controlled. The control over visual information such as display information may include changing (e.g. switching) the display mode of the display information such as color and shape in addition to displaying an animation.

4.3. Example 3

Example in which Showing Information is Controlled in Accordance with Processing Content With reference to FIGS. 14 to 17, the following describes, as an Example 3, an example in which the outputs of speech information and other information (such as display information) output in synchronization with the speech information are controlled in accordance with the processing content based on a speech input from a user.

Figure 14:
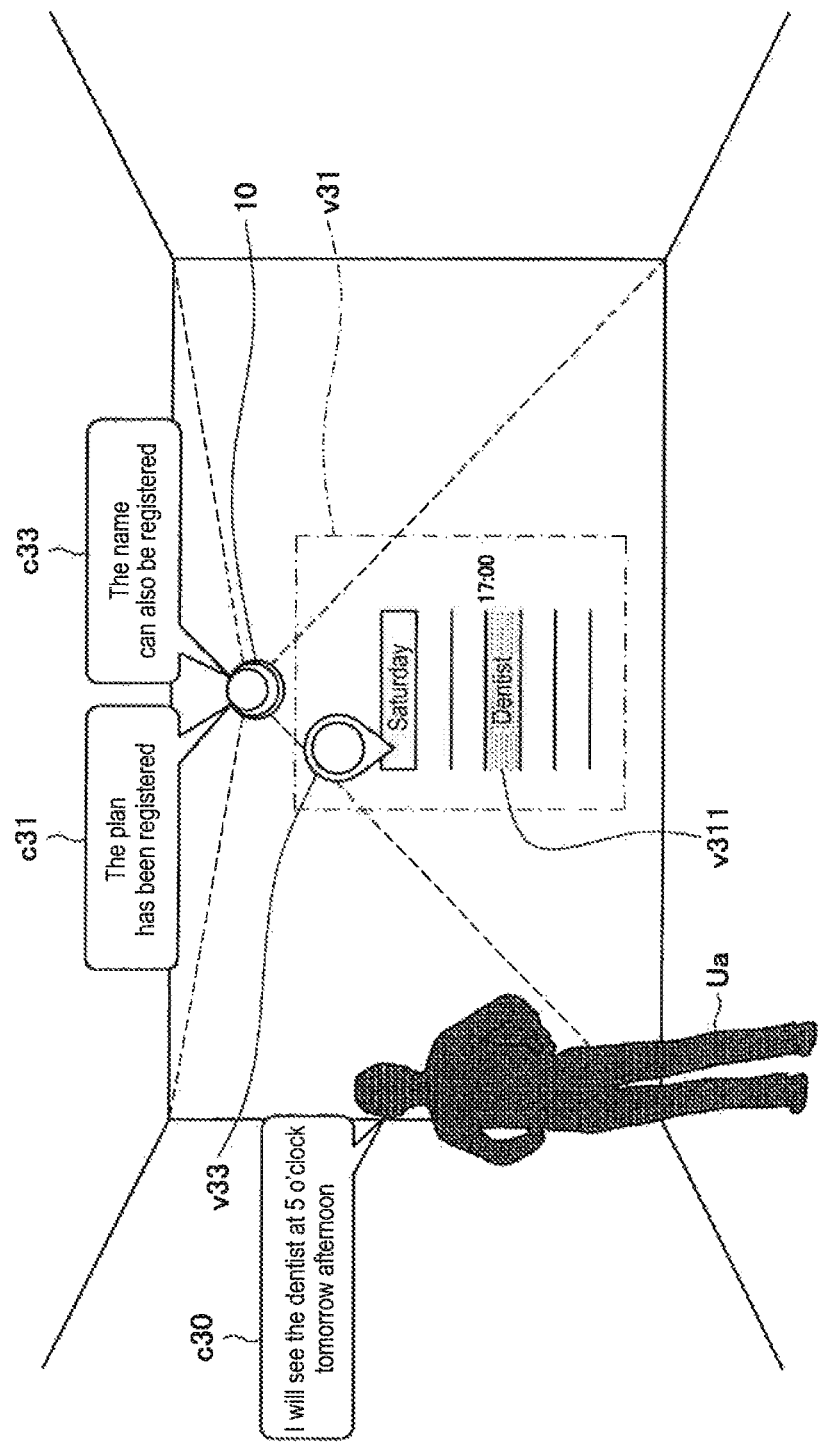
FIG. 14 is an explanatory diagram for describing an example of an operation of an information processing device according to an Example 3.

For example, FIG. 14 illustrates an example in which the information processing device 10 receives a speech input c30 of "I will see the dentist at 5 o'clock tomorrow afternoon" from the user Ua, registers the plan based on the speech input c30 in the "family calendar" function, and responds to the user Ua.

The information processing device 10 then identifies the "family calendar" function as the corresponding function on the basis of an analysis result of the speech input c30, and displays a screen v31 of the "family calendar" function onto the display plane.

The information processing device 10 outputs speech information c31 of "The plan has been registered", and shows, at the corresponding position on the screen v31, display information v311 indicating the plan of "dentist" at "5 o'clock in the afternoon" in synchronization with the output of the speech information c31. The information processing device 10 may then show the user Ua that a new plan has been shown, by displaying the display information v311 as an animation.

In the example illustrated in FIG. 14, it may be shown that it is possible to add information to the registered plan, by outputting speech information c33 of "The name can also be registered" to the user Ua after a response based on the speech information c31 and the display information v311. In this case, the information processing device 10 may control the display mode of display information v33 corresponding to the processing content, in other words, "registering name", shown by the speech information c33 to the user Ua in synchronization with the output of the speech information c33.

As a specific example, the information processing device 10 may control the display of the display information v33 for registering the name in a manner that the display information v33 blinks as many times as the predetermined number of times in synchronization with the output of the speech information c33, thereby showing the user the relationship between the shown processing content and the display information.

Figure 15:
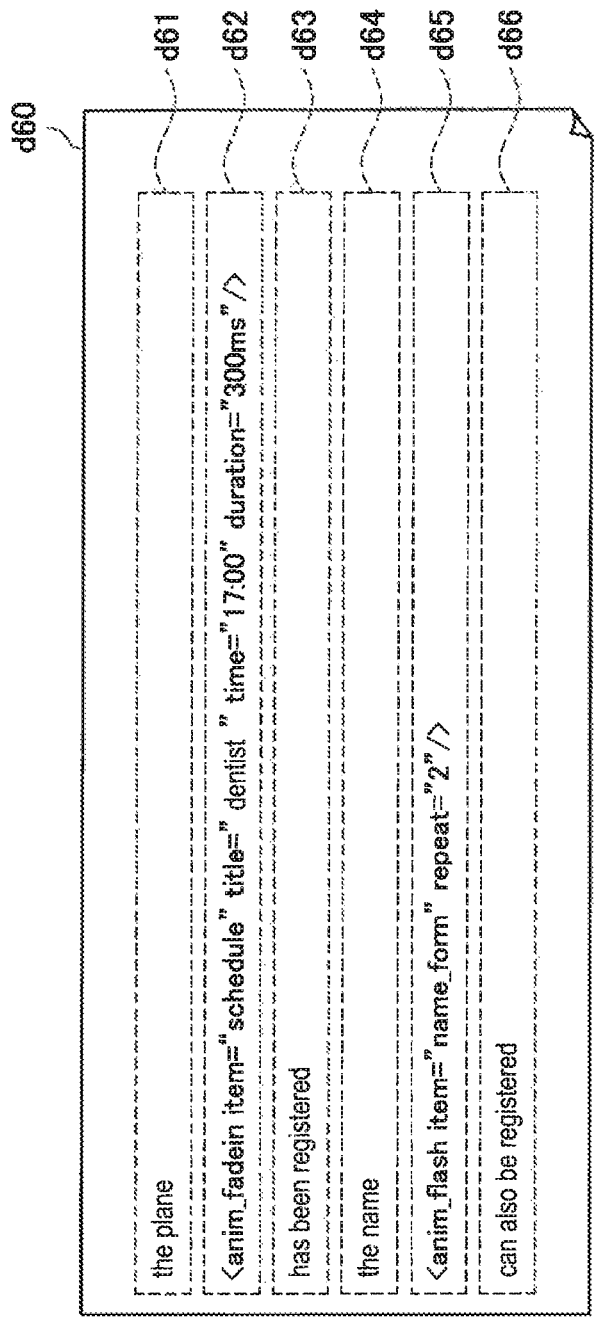
FIG. 15 is an explanatory diagram for describing an example of response information according to the Example 3.

With reference to FIG. 15, an example of response information for the information processing device 10 to make a response as illustrated in FIG. 14 will be described. FIG. 15 is an explanatory diagram for describing an example of response information d60 according to the Example 3.

As illustrated in FIG. 15, control information d62 and control information d65 for controlling the outputs of the display information v311 and the display information v33 are embedded into the response information d60 for the response content of "The plan has been registered" and the response content of "The name can also be registered".

Expressions d61, d63, d64, and d66 respectively represented by "the plan", "has been registered", "the name", and "can also be registered" in the response information d60 indicate the information that serves as a response and is output as speech, in other words, the respective expressions in the response content.

The control information d62 is control information for displaying the plan specified in the "title" attribute onto the display screen v31 of "family calendar" specified as "schedule" in the "item" attribute in a manner that the plan fades in at the position corresponding to the time specified in the "time" attribute. Additionally, in the example illustrated in FIG. 15, the control information d62 specifies, as the "duration" attribute, the period for which the plan specified in "title" fades in.

The control information d65 is control information for displaying the display information v33 for registering the name as "name_form" in the "item" attribute in a manner that the display information v33 blinks as many times as the number of times specified in the "repeat" attribute.

The content of the response processing based on the response information d60 will not be described in detail because it is similar to those of the above-described embodiment and Examples.

When the information processing device 10 shows the user Ua that information can be additionally input as illustrated in FIG. 15, the information processing device 10 may continue the processing for the "family calendar" function without terminating the executed "family calendar" function.

Figure 16:
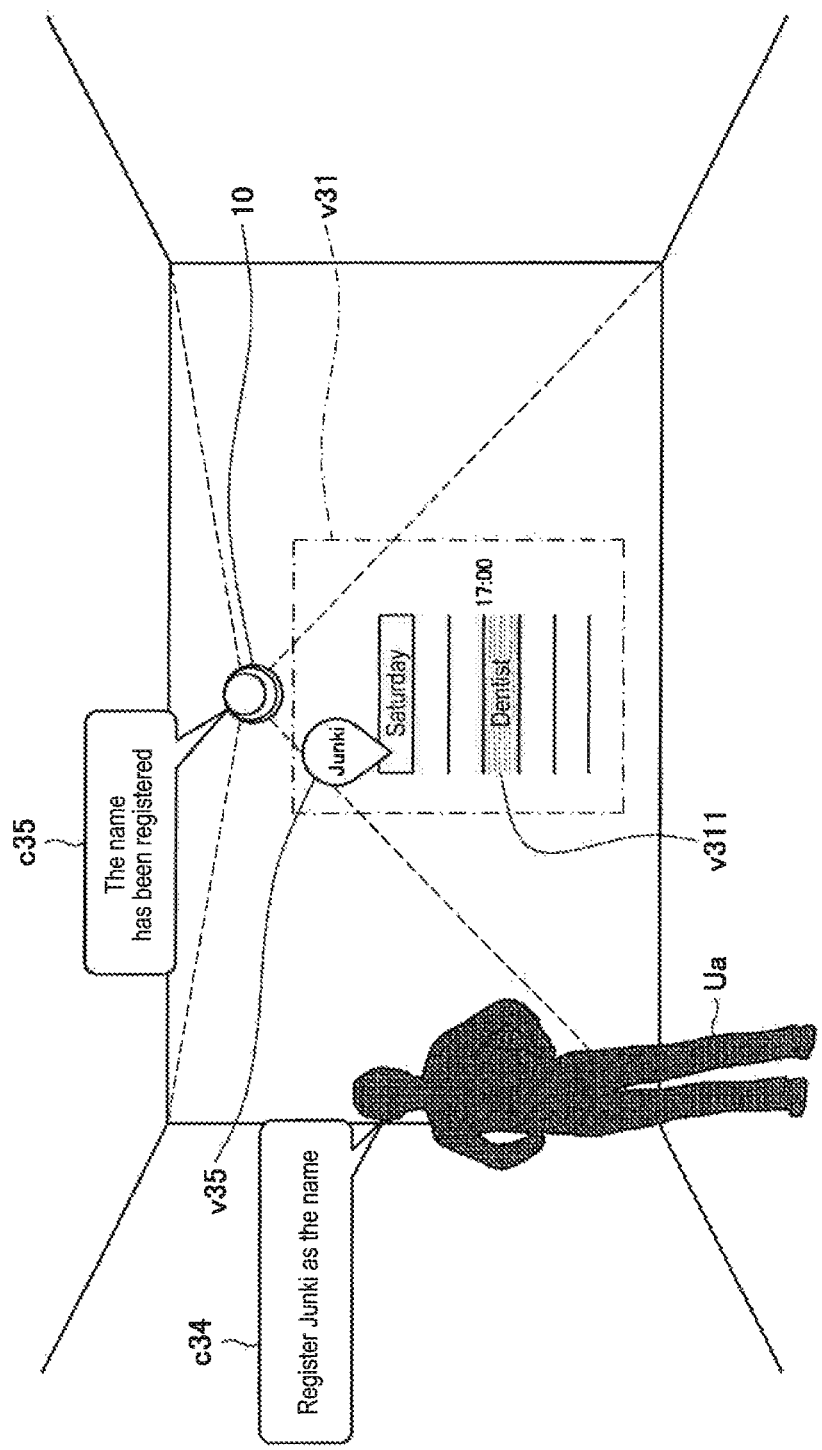
FIG. 16 is an explanatory diagram for describing an example of the operation of the information processing device according to an Example 3.

Next, with reference to FIG. 16, an example of the operation performed when the user Ua makes a new speech input in response to the response of "The name can also be registered" illustrated in FIG. 15 will be described. FIG. 16 is an explanatory diagram for describing an example of the operation of the information processing device 10 according to the Example 3. The example illustrated in FIG. 16 illustrates that the information processing device 10 receives a speech input c34 of "Register Junki as the name" said by the user Ua in receiving the response of "The name can also be registered".

The information processing device 10 may then narrow down the range to identify the response content in analyzing the acquired speech input c34 by taking the status of the function being executed into consideration. As a specific example, in the example illustrated in FIG. 16, the information processing device 10 may recognize the acquired speech input c34 as the input information for the "family calendar" function being executed, and identify the corresponding response content.

Once the information processing device 10 acquires the speech input c24, the information processing device 10 analyzes the speech input c24. The information processing device 10 hereby recognizes that the content to be registered as "the name" is "Junki" and associates "Jnnki" with the plan of "the dentist" registered in advance.

The information processing device 10 outputs speech information c35 of "The name has been registered", and shows display information v35 having the name of "Junki" input thereto for the display information v33 illustrated in FIG. 15 in synchronization with the output of the speech information c35. The information processing device 10 may then show the user Ua that the name of "Junki" specified by the user Ua has been registered, by displaying the display information v35 so as to fade in the name "Junki" in the display information v33.

Figure 17:
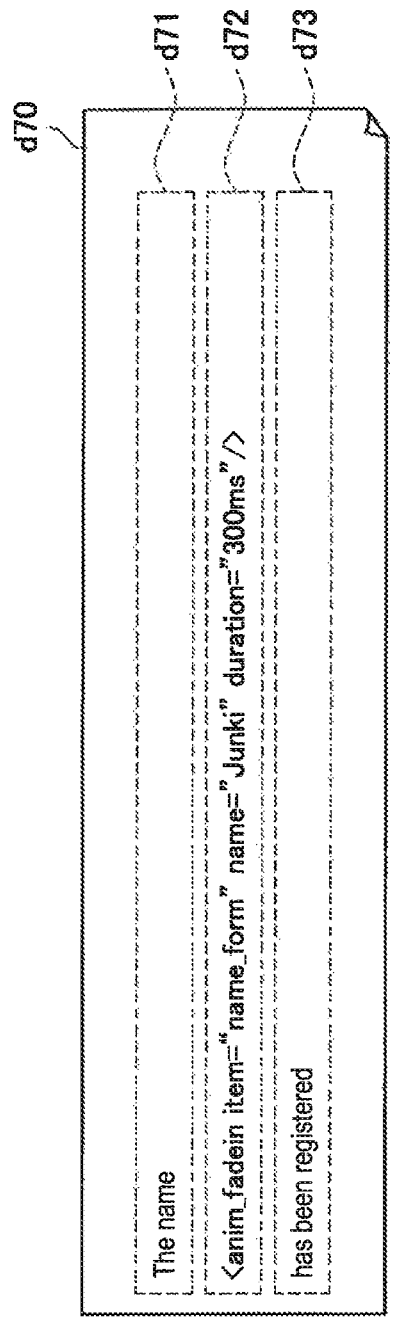
FIG. 17 is an explanatory diagram for describing an example of the response information according to the Example 3.

With reference to FIG. 17, an example of response information for the information processing device 10 to make a response as illustrated in FIG. 16 will be described. FIG. 17 is an explanatory diagram for describing an example of response information d70 according to the Example 3.

As illustrated in FIG. 17, control information d72 for controlling the output of the display information v35 is embedded into the response information d70 for the response content of "The name has been registered".

Expressions d71 and d73 in the response information d70 respectively represented by "the name" and "has been registered" indicate the information that serves as a response and is output as speech, in other words, the respective expressions in the response content.

The control information d72 is control information for displaying the display information v35 in a manner that the name "Junki" specified in the "name" attribute is displayed so as to fade in into the display information v33 specified as "name_form" in the "item" attribute. Additionally, in the example illustrated in FIG. 17, the control information d72 specifies, as the "duration" attribute, the period for which the name specified in "name" fades in.

The content of the response processing based on the response information d70 will not be described in detail because it is similar to those of the above-described embodiment and Examples.

As described above as the Example 3 with reference to FIGS. 14 to 17, the information processing device 10 may control the outputs of speech information and other information (such as display information) output in synchronization with the speech information in accordance with the processing content based on a speech input from a user.

4.4. Example 4

Example of Method of Showing Information to Plurality of Users

The following describes, as an Example 4, an example of the configuration and the operation for the information processing device 10 to respond to a plurality of users in response to the speech inputs from the respective users.

Figure 18:
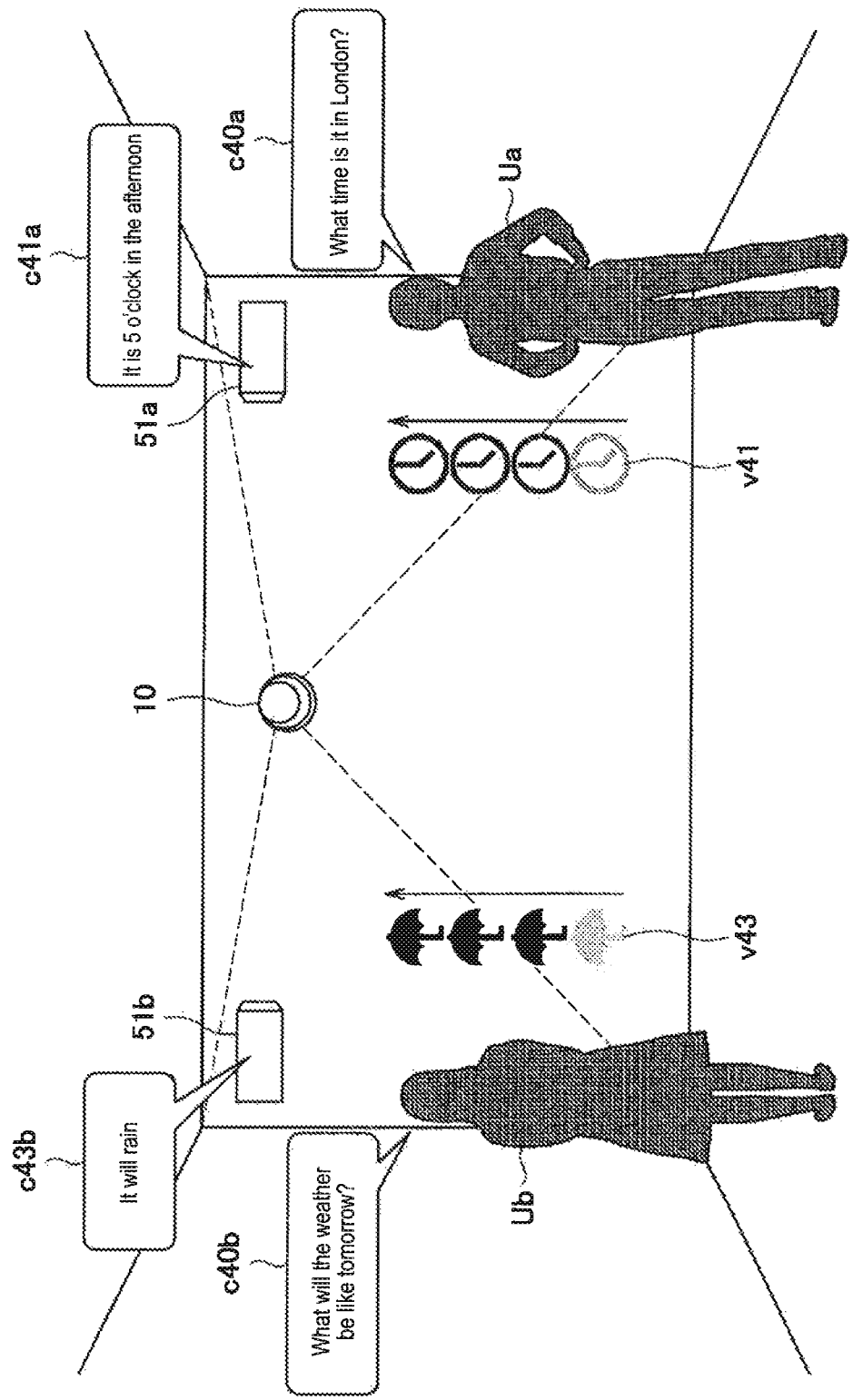
FIG. 18 is a diagram for describing an example of an information processing device according to an Example 4.

For example, FIG. 18 is a diagram for describing an example of the information processing device 10 according to the Example 4. In the example illustrated in FIG. 18, the information processing device 10 includes a plurality of audio output units 51a and 51 as the audio output unit 51 for outputting speech information. When the information processing device 10 makes speech outputs in response to speech inputs from users, the information processing device 10 makes a speech output via one of the plurality of audio output units 51a and 51b that is positioned nearer to the user who is the speaker of the speech input. The information processing device 10 then displays display information near the user in coordination with the speech output.

For example, in the example illustrated in FIG. 18, the information processing device 10 outputs speech information c41a of "It is 5 o'clock in the afternoon" from the audio output unit 51a positioned near the user Ua in response to a speech input c40a of "What time is it in London?" said by the user Ua. In addition, the information processing device 10 then controls the display of the display information v41 corresponding to the "clock" function so as to fade in the display information v41 at the position corresponding to the area near the user Ua in the display plane in synchronization with the output of the speech information c41a.

Meanwhile, the information processing device 10 outputs speech information c41b of "It will rain" from the audio output unit 51b positioned near a user Ub in response to a speech input c40b of "What will the weather be like tomorrow?" said by the user Ub. In addition, the information processing device 10 then controls the display of the display information v43 corresponding to the "weather forecast" function so as to fade in the display information v43 at the position corresponding to the area near the user Ub in the display plane in synchronization with the output of the speech information c41b.

In this case, the information processing device 10 estimates the source from which the speech input c40 is said, in other words, the position of the user Ua, on the basis of the direction from which, for example, the speech input c40a of "What time is it in London?" comes. In addition, the information processing device 10 analyzes the speech input c40a of "What time is it in London?", and generates response information for responding to the speech input c40 on the basis of an analysis result. The information processing device 10 then associates an estimation result of the position of the user Ua with the generated response information.

When the information processing device 10 responds to the speech input c40a of the user Ua on the basis of the generated response information, the information processing device 10 identifies a destination to which the speech information and the display information are output, on the basis of the estimation result of the position of the user Ua which is associated with the response information. Specifically, the information processing device 10 identifies the audio output unit 51a, which outputs the speech information c41a of "It is 5 o'clock in the afternoon" serving as a response to the speech input c40a, on the basis of the estimation result of the position of the user Ua. Based on the estimation result of the position of the user Ua, the information processing device 10 further identifies the area in the display plane in the direction in which the user Ua is present with respect to the information processing device 10, as the position at which the display information v41 corresponding to the "clock" function is displayed.

Additionally, when the information processing device 10 responds to the speech input c40b of "What will the weather be like tomorrow?" said by the user Ub, the information processing device 10 estimates the position of the user Ub and controls the outputs of the speech information c41b and the display information v43 on the basis of an estimation result in a similar way.

Figure 19:
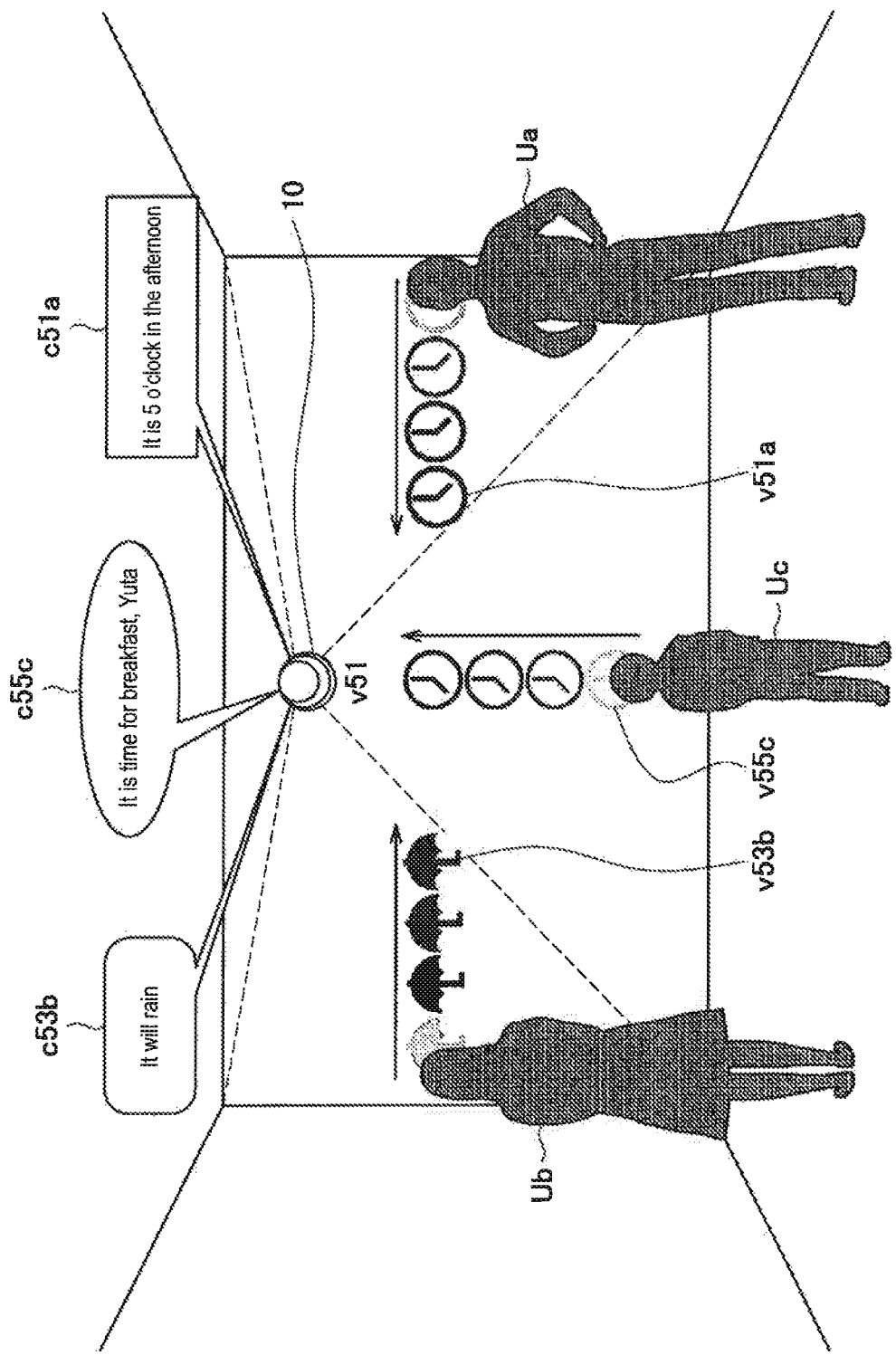
FIG. 19 is a diagram for describing another example of the information processing device according to the Example 4.

FIG. 19 is a diagram for describing another example of the information processing device 10 according to the Example 1. In the example illustrated in FIG. 19, the information processing device 10 identifies a user who is a speaker of a speech input, and controls the output modes of speech information and display information output as a response to the speech input in accordance with the identified user.

For example, in the example illustrated in FIG. 19, when the information processing device 10 makes a response on the basis of a speech output, the information processing device 10 changes the way of saying the speech output, the tone of the speech output, the vocal sound of the speech output, or the like in accordance with a user to whom to respond to. As a specific example, the information processing device 10 changes the way of saying a speech output for the adult users Ua and Ub, and a child user Uc.

The information processing device 10 may include, in response content to be output as speech, information (such as a name) that brings the recognized user into mind. As a specific example, in the example illustrated in FIG. 19, the information processing device 10 generates response content including the name of the user Uc like "It is time for breakfast, Yuta" as a response to the user Uc, and outputs speech information c55c indicating the response content.

The information processing prime minister 10 may also change the display mode of display information in accordance with a user to whom to respond in outputting the display information. For example, in the example illustrated in FIG. 19, the information processing device 10 switches the directions to fade in the display information into the display plane, in accordance with a user to whom to respond.

Specifically, the information processing device 10 controls the output of display information v51a so as to fade in the display information v51a from right to left in the display plane as a response to the user Ua in synchronization with the output of the speech information c51a. The information processing device 10 controls the output of display information v53b so as to fade in the display information v53b from left to right in the display plane as a response to the user Ub in synchronization with the output of the speech information c53b. The information processing device 10 similarly controls the output of display information v55c so as to fade in the display information v55c from down to up in the display plane as a response to the user Uc in synchronization with the output of the speech information c55c.

In this case, the information processing device 10 extracts a characteristic such as a voiceprint from a speech input from each user on the basis of so-called speaker recognition technology, and compares the extracted characteristic with the characteristic of each user which is stored in advance, thereby identifying the user. The information processing device 10 then generates response information on the basis of an analysis result of the speech input, and associates the information on the user identified on the basis of the speech input with the generated response information.

When the information processing device 10 performs response processing on the basis of the generated response information, the information processing device 10 recognizes a user to whom to respond on the basis of the information on the user which is associated with the response information, and controls the output modes of speech information and display information in accordance with the recognized user.

As described above as the Example 4, when the information processing device 10 responds to a plurality of users, the information processing device 10 may control the output modes of speech information to be output in response to a speech input and other information to be output in synchronization with the speech information, on the basis of the position of each user and an identification result of each user.

4.5. Example 5

Example of Method of Showing Information with Interrupt by User

Figure 20:
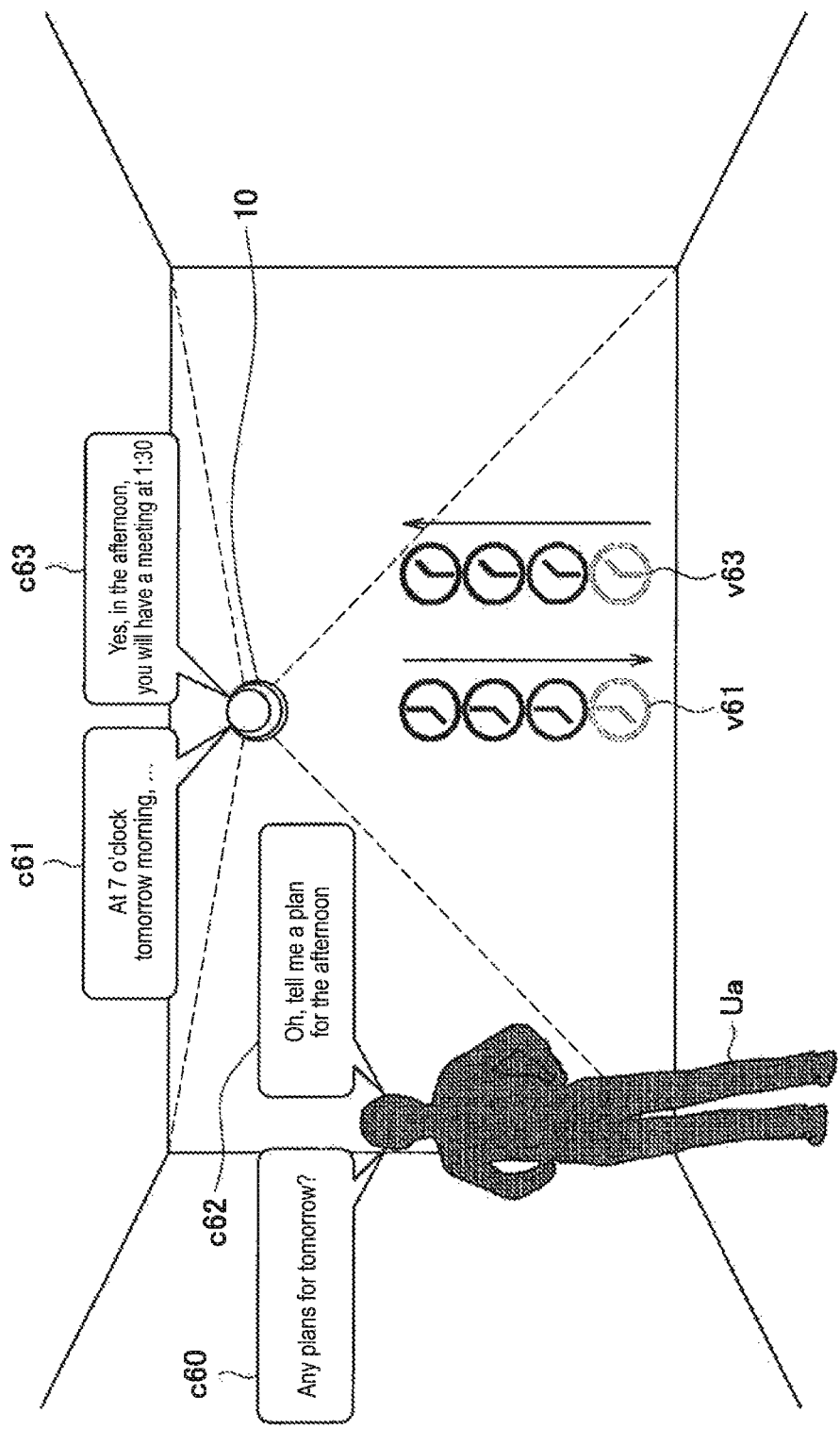
FIG. 20 is a diagram for describing an example of an information processing device according to an Example 5.

With reference to FIG. 20, the following describes, as an Example 5, an example of a method for the information processing device 10 to show information when a user interrupts and makes a new speech input while the information processing device 10 is responding to a speech input from the user. FIG. 20 is a diagram for describing an example of the information processing device 10 according to the Example 5.

It is assumed in the example illustrated in FIG. 20 that the information processing device 10 first receives a speech input c60 of "Any plans for tomorrow?" from the user Ua. The information processing device 10 then outputs speech information c61 of "At 7 o'clock tomorrow morning, . . . " indicating a plan in the morning schedule as a response to the speech input c60, and fades in display information v61 into the display plane in synchronization with the output of the speech information c61.

It is assumed that while the information processing device 10 is outputting the speech information c61 and the display information v61, the user Ua makes a speech input c62 of "Oh, tell me a plan for the afternoon" to request the information processing device 10 to show the plans in the afternoon schedule.

Receiving this speech input c62, the information processing device 10 cancels the outputs of the speech information c61 and the display information v61 which the information processing device 10 has been making. The information processing device 10 then controls the output of the display information v61 so as to fade out the display information v61 fading in into the display plane from the display plane. The information processing device 10 shows the user Ua through such display control that the outputs of the speech information c61 and the display information v61 which the information processing device 10 has been making are canceled.

The information processing device 10 newly outputs speech information c63 of "Yes, in the afternoon, you will have a meeting at 1:30" indicating a plan in the afternoon schedule, and fades in display information v63 into the display plane in synchronization with the output of the speech information c63.

If the information processing device 10 cancels an information output that the information processing device 10 is making, and newly shows information, the information processing device 10 may control the output of the new information so as to indicate that the new information is shown. As a specific example, the information processing device 10 may display the newly displayed display information v63 at the same position as the position of the display information v61, or at a different position from the position of the display information v61.

If the information processing device 10 newly outputs speech information upon cancellation, the information processing device 10 may output new speech information with different wording from the wording used before the cancellation. As a specific example, in the example illustrated in FIG. 20, the information processing device 10 changes the way how the prepositional phrase is used so as to emphasize the expression of "afternoon" in the speech input c62. The information processing device 10 may further include expressions such as "Yes" and "I see" in the response content to indicate that a new speech input has been received.

Needless to say, the information processing device 10 can recognize that a user interrupts and makes a new speech input while the information processing device 10 is making a response, by monitoring the timing at which the speech input is received and a processing sequence of the response processing for the speech input.

As described above as the Example 5, if a user interrupts and makes a new speech input while the information processing device 10 is making a response to a speech input from the user, the information processing device 10 may show the user that the response which the information processing device 10 has been making is canceled. If the information processing device 10 makes a new response for the cancellation of the response, the information processing device 10 may further show speech information to be output as a response and other information (such as display information) to be output in synchronization with the speech information in a different display mode from the display mode used before the cancellation.

<5. Hardware Configuration>

Figure 21:
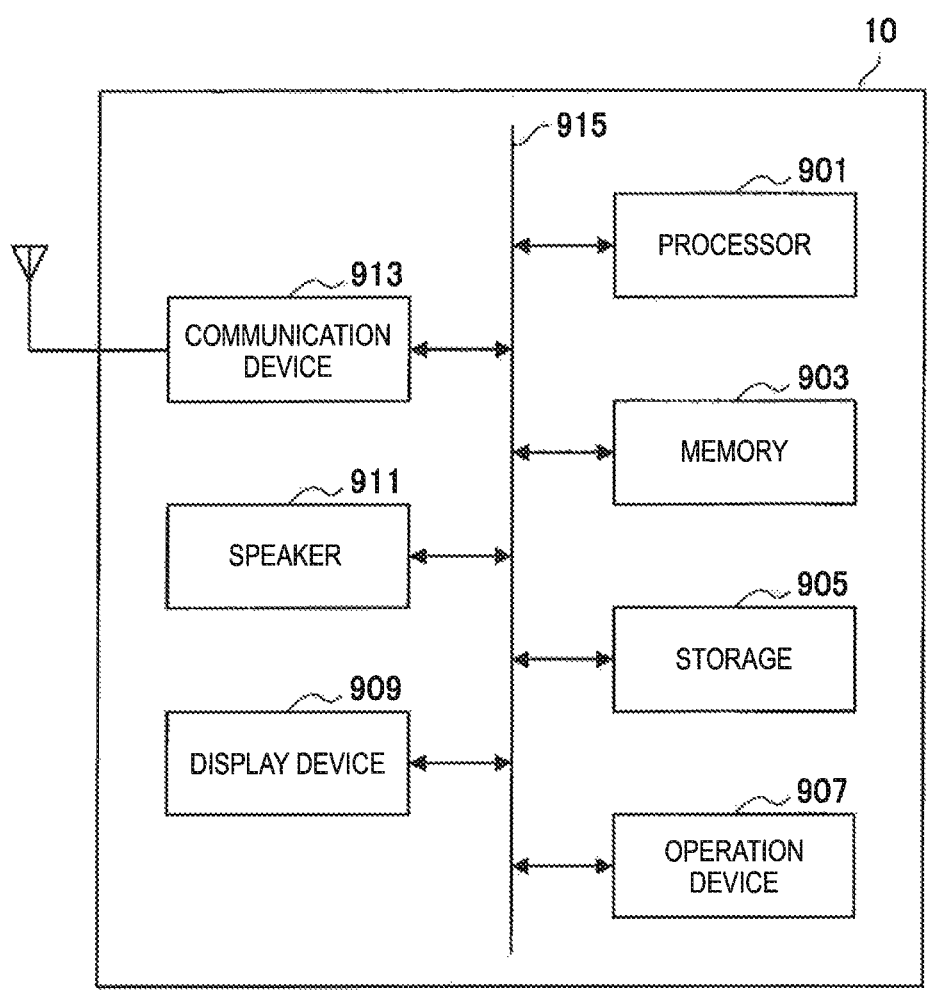
FIG. 21 is a diagram illustrating an example of a hardware configuration of the information processing device according to the embodiment.

Next, an example of the hardware configuration of the information processing device 10 according to each embodiment of the present disclosure will be described with reference to FIG. 21. FIG. 21 illustrates an example of the hardware configuration of the information processing device 10 according to an embodiment of the present disclosure.

As illustrated in FIG. 21, the information processing device 10 according to the present embodiment includes a processor 901, a memory 903, a storage 905, a speaker 911, a communication device 913, and a bus 915. The information processing device 10 may also include an operation device 907 and a display device 909.

The processor 901 may be, for example, a central processing unit (CPU), a graphics processing unit (GPU), a digital signal processor (DSP), or a system on chip (SoC), and executes various kinds of processing of the information processing device 10. The processor 901 can be made of, for example, an electronic circuit for executing a variety of operations. The input information analysis unit 101, the response information generation unit 103, the processing execution unit 105, the response control unit 111, the speech synthesis unit 115, and the display control unit 117 discussed above can be implemented by the processor 901.

The memory 903 includes random access memory (RAM) and read only memory (ROM), and stores a program to be executed by the processor 901 and data. The storage 905 may include a storage medium such as semiconductor memory and a hard disk. For example, the dictionary information storage unit 109 discussed above can be configured as at least one of the memory 903 and the storage 905, or a combination thereof.

The operation device 907 has a function of generating an input signal for allowing a user to perform a desired operation. The operation device 907 may be made of, for example, an input unit such as a button and a switch for allowing a user to input information, and an input control circuit for generating an input signal on the basis of an input from a user and supplying the input signal to the processor 901.

The display device 909 is an example of an output device, and may be a device such as a liquid crystal display (LCD) display and an organic light emitting diode (OLED) display. In this case, the display device 909 can notify a user of predetermined information by displaying a screen. The display unit 53 discussed above can be implemented by the display device 909.

The speaker 911 is an example of an output device for outputting an audio signal and a speech signal. The audio output unit 51 discussed above can be implemented by the speaker 911.

The communication device 913 is a communication means included in the information processing device 10, and communicates with an external device via a network. The communication device 913 is a wired or wireless communication interface. If the communication device 913 is configured as a wireless communication interface, the communication device 913 may include a communication antenna, a radio frequency (RF) circuit, a baseband processor, and the like.

The communication device 913 has a function of performing a variety of signal processing on a signal received from an external device, and can supply a digital signal generated from the received analogue signal to the processor 901.

The bus 913 connects the processor 901, the memory 903, the storage 905, the operation device 907, the display device 909, the speaker 91, and the communication device 913 to each other. The bus 915 may include a plurality of types of bus.

It is also possible to manufacture a program for causing hardware such as a processor, a memory, and a storage built in a computer to perform the functions corresponding to components in the information processing device 10. There may also be provided a computer-readable storage medium having the program recorded thereon.

<6. Conclusion>

As described above, the information processing device 10 according to the present embodiment includes a so-called interactive interface that allows the information processing device 10 to interact with a user by responding to a speech input made by a user on the basis of a speech output and other information (such as display information) different from the speech output. Based on such a configuration, the information processing device 10 according to the present embodiment controls the output of the other information related to each function in synchronization with the speech output of the expression corresponding to the function. This allows a user to intuitively recognize the other information corresponding to a function output as speech.

The above describes an example in which the information processing device 10 controls the output of the other information related to each function in synchronization with the speech output of the expression corresponding to the function, but the speech output does not necessarily have to be completely synchronized with the output of the other information. For example, some environments in which a user operates the information processing device 10, or some ways in which the information processing device 10 is used may delay one of the speech output and the other output with respect to the other one of the outputs as long as the relationship between the outputs can be recognized. In this case, the information processing device 10 may control the delay amount (i.e. output timing) in accordance with the length of information to be output as speech or the type of other information.

The above describes an example in which a speech input said by a user to input information is applied as an input means for the user to input the information into the information processing device 10, but the means for a user to input information into the information processing device 10 is not necessarily limited to a speech input.

For example, the information processing device 10 may acquire a user input via an input device such as a keyboard, a mouse, or a touch panel. As a specific example, the information processing device 10 may receive an operation made by a user such as moving a cursor and a determining a selection target through a key operation and a mouse operation, and tapping onto a touch panel, and recognize display information selected by the user from display information displayed on the display unit.

As another example, the information processing unit 10 may provide an interface for a user to input information through a gesture input. As a specific example, the information processing device 10 may recognize an operation (gesture) of a user on the basis of an image of the user captured by the imaging unit, and recognize information (such as display information displayed on the display unit) selected by the user on the basis of the gesture input in accordance with the recognized operation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing device including:
a control unit configured to control an output of other information different from a speech output related to a predetermined function on the basis of timing information on timing at which the speech output of an expression related to the function among a set of expressions is made, the set of expressions including the expression related to the function.

(2)
The information processing device according to (1), wherein
the other information is display information displayed on a display unit.

(3)
The information processing device according to claim 2, wherein
the control unit controls a speech output of the set of expressions (4)
The information processing device according to (3), wherein
the control unit controls the speech output of the set of expressions on the basis of speech synthesis processing performed by a speech synthesis unit.

(5)
The information processing device according to (4), wherein
the speech synthesis processing is processing executed on the basis of a speech input of a user.

(6)
The information processing device according to (5), wherein
the set of expressions is generated in accordance with semantic content indicated by the speech input of the user (7)
The information processing device according to any one of (4) to (6), wherein
the control unit controls an output of display information related to the function in synchronization with the speech output of the expression related to the function.

(8)
The information processing device according to (7), wherein
the control unit changes the display information related to the function in synchronization with the speech output of the expression related to the function.

(9)
The information processing device according to (7), wherein
the control unit controls making the display information related to the function visible and invisible in synchronization with the speech output of the expression related to the function.

(10)
The information processing device according to (7), wherein
the control unit controls an output of audio information related to the function in synchronization with the speech output of the expression related to the function.

(11)
The information processing device according to (7), wherein
the control unit controls light emission of a light emitting unit with a number of an issuance times or a light-emitting pattern according to the function in synchronization with the speech output of the expression related to the function.

(12)
The information processing device according to any one of (1) to (11), wherein
the set of expressions includes an expression indicating processing content according to the function, and
the control unit controls an output of other information different from a speech output according to the processing content in synchronization with the speech output of the expression indicating the processing content among the set of expressions.

(13)

The information processing device according to any one of (7) to (11), wherein the control unit controls the output of the other information related to the function in synchronization with timing at which the expression related to the function is output as speech.

(14)

The information processing device according to any one of (7) to (11), wherein the control unit controls the output of the other information related to the function in synchronization with a period for which the expression related to the function is output as speech.

(15)

The information processing device according to any one of (1) to (14), wherein the control unit controls the output of the other information related to the function on the basis of control information associated with the expression related to the function.

(16)

The information processing device according to (15), wherein the control unit uses the control information as tag information associated with text information indicating the expression related to the function, and controls the output of the other information related to the function on the basis of the control information embedded in the text information indicating the set of expressions.

(17)

The information processing device according to any one of (2) to (11), wherein the display information is a selection target of a selection operation performed by a user.

(18)

An information processing method including:

controlling, by a processor, an output of other information different from a speech output related to a predetermined function on the basis of timing information on timing at which the speech output of an expression related to the function among a set of expressions is made, the set of expressions including the expression related to the function.

(19)

A program for causing a computer to execute:

controlling an output of other information different from a speech output related to a predetermined function on the basis of timing information on timing at which the speech output of an expression related to the function among a set of expressions is made, the set of expressions including the expression related to the function.

REFERENCE SIGNS LIST 10 information processing device
101 input information analysis unit
103 response information generation unit
105 processing execution unit
109 dictionary information storage unit
111 response control unit
115 speech synthesis unit
117 display control unit
41 sound collection unit
51 audio output unit
53 display unit

The invention claimed is:

1. An information processing device comprising:
circuitry configured to
control a speech output of an expression related to a function among a set of expressions by an audio output unit,
control an output of information different from the speech output of the expression and related to the function and the expression at a time synchronized with timing information indicating a timing at which the speech output of the expression is made,
control a speech output of another expression related to another function among the set of expressions by the audio output unit, and
control an output of other information different from the speech output of the another expression and related to the another function and the another expression at another time synchronized with another timing information indicating a timing at which the speech output of the another expression is made,
wherein the outputting of the information is controlled to begin an operation of the information at the time synchronized with the timing information and controlled to finish the operation of the information within a predetermined period of time after the timing at which the speech output of the expression is made,
wherein the outputting of the information is controlled to begin another operation of the information related to the expression at the another time synchronized with the another timing information simultaneously with the outputting of the other information related to the another expression, and controlled to finish the another operation of the information within a predetermined period of time after the timing at which the speech output of the another expression is made, and
wherein the another operation is opposite to the operation.

2. The information processing device according to claim 1, wherein the information includes display information displayed by a display unit.

3. The information processing device according to claim 2, wherein the circuitry is further configured to
control a speech output of the set of expressions.

4. The information processing device according to claim 3, wherein the circuitry is further configured to
perform speech synthesis processing, and
control the speech output of the set of expressions on the basis of the speech synthesis processing.

5. The information processing device according to claim 4, wherein the speech synthesis processing is processing executed on the basis of a speech input of a user.

6. The information processing device according to claim 5, wherein the set of expressions is generated in accordance with semantic content indicated by the speech input of the user.

7. The information processing device according to claim 4, wherein the circuitry is further configured to
control an output of display information related to the function in synchronization with the speech output of the expression related to the function.

8. The information processing device according to claim 7, wherein the circuitry is further configured to
change the display information related to the function in synchronization with the speech output of the expression related to the function.

9. The information processing device according to claim 7, wherein the circuitry is further configured to
control making the display information related to the function visible and invisible in synchronization with the speech output of the expression related to the function.

10. The information processing device according to claim 7, wherein the circuitry is further configured to
control an output of audio information related to the function in synchronization with the speech output of the expression related to the function.

11. The information processing device according to claim 7, wherein the circuitry is further configured to
control light emission of a light emitting unit with a number of an issuance times or a light-emitting pattern according to the function in synchronization with the speech output of the expression related to the function.

12. The information processing device according to claim 1, wherein
the set of expressions includes an expression indicating processing content according to the function, and
the circuitry is further configured to
control the output of the information different from the speech output according to the processing content in synchronization with the speech output of the expression indicating the processing content among the set of expressions.

13. The information processing device according to claim 7, wherein the circuitry is further configured to
control the output of the information related to the function in synchronization with timing at which the expression related to the function is output as speech.

14. The information processing device according to claim 7, wherein the circuitry is further configured to
control the output of the information related to the function in synchronization with a period for which the expression related to the function is output as speech.

15. The information processing device according to claim 1, wherein the circuitry is further configured to
control the output of the information related to the function on the basis of control information associated with the expression related to the function.

16. The information processing device according to claim 15, wherein the circuitry is further configured to
utilize the control information as tag information associated with text information indicating the expression related to the function, and control the output of the information related to the function on the basis of the control information embedded in the text information indicating the set of expressions.

17. The information processing device according to claim 2, wherein the display information includes a selection target of a selection operation performed by a user.

18. The information processing device according to claim 1, wherein the operation includes a fade-in operation and the another operation includes a fade-out operation.

19. The information processing device according to claim 1, wherein the operation includes an expansion operation and the another operation includes a shrinkage operation.

20. The information processing device according to claim 1, wherein the outputting of the other information is controlled to begin the operation of the other information at the another time synchronized with the another timing information simultaneously with the beginning of the another operation of the information, and controlled to finish the operation of the other information within the predetermined period of time after the timing at which the speech output of the another expression is made.

21. The information processing device according to claim 1, wherein the outputting of the other information and the outputting of the another operation of the information simultaneously begin at the another time synchronized with the another timing information.

22. The information processing device according to claim 1, wherein the outputting of the operation of the other information and the outputting of the another operation of the information simultaneously begin at the another time synchronized with the another timing information.

23. An information processing method comprising:
controlling, by a processor, a speech output of an expression related to a function among a set of expressions by an audio output unit;
controlling, by the processor, an output of information different from the speech output of the expression and related to the function and the expression at a time synchronized with timing information indicating a timing at which the speech output of the expression is made;
controlling, by the processor, a speech output of another expression related to another function among the set of expressions by the audio output unit; and
controlling, by the processor, an output of other information different from the speech output of the another expression and related to the another function and the another expression at another time synchronized with another timing information indicating a timing at which the speech output of the another expression is made,
wherein the outputting of the information is controlled to begin an operation of the information at the time synchronized with the timing information and controlled to finish the operation of the information within a predetermined period of time after the timing at which the speech output of the expression is made,
wherein the outputting of the information is controlled to begin another operation of the information related to the expression at the another time synchronized with the another timing information simultaneously with the outputting of the other information related to the another expression, and controlled to finish the another operation of the information within a predetermined period of time after the timing at which the speech output of the another expression is made, and
wherein the another operation is opposite to the operation.

24. A non-transitory computer-readable medium having embodied thereon a program, which when executed by a computer causes the computer to execute an information processing method, the method comprising:
controlling a speech output of an expression related to a function and the expression among a set of expressions by an audio output unit;
controlling an output of information different from the speech output of the expression and related to the function at a time synchronized with timing information indicating a timing at which the speech output of the expression is made;
controlling a speech output of another expression related to another function among the set of expressions by the audio output unit; and
controlling an output of other information different from the speech output of the another expression and related to the another function and the another expression at another time synchronized with another timing information indicating a timing at which the speech output of the another expression is made, wherein the outputting of the information is controlled to begin an operation of the information at the time synchronized with the timing information and controlled to finish the operation of the information within a predetermined period of time after the timing at which the speech output of the expression is made, wherein the outputting of the information is controlled to begin another operation of the information related to the expression at the another time synchronized with the another timing information simultaneously with the outputting of the other information related to the another expression, and controlled to finish the another operation of the information within a predetermined period of time after the timing at which the speech output of the another expression is made, and wherein the another operation is opposite to the operation.

* * * * *